(12) United States Patent
Nault

(10) Patent No.: US 8,965,799 B2
(45) Date of Patent: Feb. 24, 2015

(54) READING, ORGANIZING AND MANIPULATING ACCOUNTING DATA

(76) Inventor: Jacques Nault, Moorea (PF)

(*) Notice: Subject to any disclaimer, the term of this patent is extended or adjusted under 35 U.S.C. 154(b) by 433 days.

(21) Appl. No.: 12/979,541

(22) Filed: Dec. 28, 2010

(65) Prior Publication Data

US 2011/0093370 A1 Apr. 21, 2011

Related U.S. Application Data

(60) Division of application No. 11/562,007, filed on Nov. 21, 2006, now Pat. No. 7,885,868, which is a continuation-in-part of application No. 09/736,345, filed on Dec. 15, 2000, now Pat. No. 7,139,729.

(60) Provisional application No. 60/172,587, filed on Dec. 20, 1999.

(51) Int. Cl.
*G06Q 40/02* (2012.01)
*G06Q 40/00* (2012.01)
*G06Q 40/06* (2012.01)
*G06Q 40/04* (2012.01)
*G06Q 10/10* (2012.01)

(52) U.S. Cl.
CPC .............. *G06Q 40/02* (2013.01); *G06Q 40/12* (2013.01); *Y10S 707/99951* (2013.01); *Y10S 707/99945* (2013.01); *Y10S 707/95* (2013.01)
USPC ........... 705/30; 705/35; 705/36 R; 707/999.2; 707/999.104; 707/950

(58) Field of Classification Search
USPC ............. 364/419; 705/30, 35, 36 R; 395/615; 707/102, 950, 999.104, 999.2
See application file for complete search history.

(56) References Cited

U.S. PATENT DOCUMENTS

| | | | |
|---|---|---|---|
| 3,610,902 A | 10/1971 | Rahenkamp et al. | |
| 4,642,767 A | 2/1987 | Lerner | |
| 4,928,247 A | 5/1990 | Doyle et al. | |
| 4,965,670 A | 10/1990 | Klinefelter | |
| 5,119,327 A | 6/1992 | Skinner | |
| 5,226,116 A | 7/1993 | Sasaki | |
| 5,367,620 A | 11/1994 | Ito et al. | |
| 5,390,113 A * | 2/1995 | Sampson | 705/30 |
| 5,586,196 A | 12/1996 | Sussman | |
| 5,740,427 A * | 4/1998 | Stoller | 1/1 |

(Continued)

OTHER PUBLICATIONS

Best Software SB. Inc., "Peachtree—Get the Insight Behind Your Number", printed on Jan. 20, 2005 from http://www.peachtree.com/peachtreeaccountingline/, 1 page.
Financial Microsystems, Inc., Client Ledger System™ Basic Features, printed on Jan. 20, 2005 from http://info.clientledgersystem.com/clsbasicfeatures.html, 4 pages.

(Continued)

*Primary Examiner* — Matthew Gart
*Assistant Examiner* — Reva R Danzig
(74) *Attorney, Agent, or Firm* — Raubvogel Law Office

(57) ABSTRACT

A financial reporting system for reading, organizing and manipulating any accounting data and producing financial reports that may be customized to the preferences of the user. In one embodiment there is an organizational data structure for accounting data, including a trial balance data structure having a plurality of trial balance data structure elements containing accounts of the accounting data, wherein the trial balance data structure elements are linked by a distinct doubly linked list of trial balance data structure elements pointers, further comprising sub-lists of trial balance data structure elements pointers to group the accounts of the accounting data into financial statement items.

8 Claims, 29 Drawing Sheets

(56) References Cited

U.S. PATENT DOCUMENTS

| | | | |
|---|---|---|---|
| 5,742,797 | A | 4/1998 | Celi et al. |
| 5,771,032 | A | 6/1998 | Cline et al. |
| 5,793,381 | A | 8/1998 | Edberg et al. |
| 5,802,539 | A | 9/1998 | Daniels et al. |
| 5,920,694 | A | 7/1999 | Carleton et al. |
| 5,986,667 | A | 11/1999 | Jevans |
| 6,085,173 | A * | 7/2000 | Suh ................................ 705/30 |
| 6,421,690 | B1 * | 7/2002 | Kirk, III .............................. 1/1 |
| 6,442,533 | B1 * | 8/2002 | Hinkle ........................ 705/36 R |
| 7,263,527 | B1 * | 8/2007 | Malcolm ........................ 705/30 |
| 2003/0001850 | A1 | 1/2003 | Katsura et al. |

OTHER PUBLICATIONS

Intuit Inc., "Solutions for Accounting Professionals", printed on Jan. 20, 2005 from http://accountant.intuit.com/products_services/quickbooks_premier_accountant_edition/index.aspx/, 2 pages.

"Peachtree Using General Ledger", Peachtree Software, 1989, pp. 1-319.

Business/Technology Editors. "Datawatch Adds New Reporting and Analysis Features to Industry-Leading Report Mining Tool". Business Wire Jul. 20, 1998.

Carter, John, "Monarch: Extracting and Organizing Multi-File Text and Data". Information Today Dec. 1, 1991: ABI/Inform Global, ProQuest. Web. Sep. 23, 2010.

* cited by examiner

```
                         Demo Company
                         General Journal
                 From March 1, 2005 to March 6, 2005

Date      No      Allocation                            Dr.        Cr.
1/3/05     2  1-Bank                                6,000.00
1/3/05     2  700-Loan                                          6,000.00
1/3/05     2  to record a bank's loan
1/3/05     2  -------------------------------
2/3/05     3  200-Inventories                       3,468.00
2/3/05     3  999-Retained earnings                 2,019.56
2/3/05     3  600-Accounts payable                              5,487.56
2/3/05     3  inventories and its depreciation
2/3/05     3  -------------------------------
3/3/05     4  600-Accounts payable                  4,653.94
3/3/05     4  1-Bank                                            4,653.94
3/3/05     4  payment of accounts payable
3/3/05     4  -------------------------------
3/3/05     5  0-Petty cash                            500.00
3/3/05     5  1-Bank                                              500.00
3/3/05     5  money in the petty cash
3/3/05     5  -------------------------------
4/2/05     6  100-Accounts receivable              15,000.00
4/2/05     6  1000-Sales - product 1                            7,000.00
4/2/05     6  1010-Sales - product 2                            5,000.00
4/2/05     6  1020-Sales - product 3                            3,000.00
4/2/05     6  1-Bank
4/2/05     6  sale to XYZ enterprise
4/2/05     6  -------------------------------
5/3/05     7  1-Bank                               13,799.70
5/3/05     7  100-Accounts receivable                          13,799.70
5/3/05     7  encashment of account receivable
5/3/05     7  -------------------------------
6/3/05     8  500-Computer                         10,000.00
6/3/05     8  1-Bank                                           10,000.00
6/3/05     8  purchase of a fixed asset
6/3/05     8  -------------------------------
6/3/05     9  3000-Travel charges                     646.35
6/3/05     9  0-Petty cash                                        245.73
6/3/05     9  10-Credit card                                      400.62
6/3/05     9  to record travel charges
6/3/05     9  -------------------------------
6/3/05    10  5000-Salaries                         2,792.02
6/3/05    10  1-Bank                                            2,792.02
6/3/05    10  to record salaries expense
6/3/05    10  -------------------------------
6/3/05    10
                                                   58,879.57  58,879.57
```

FIGURE 3a

Demo Company
General Journal
From March 1, 2005 to March 6, 2005

Allocation

| Date | No | Account Title | Dr. | Cr. |
|------|----|----|----|----|
| 1/03/05 | 2 | 1-Bank | 6,000.00 | |
| 1/03/05 | 2 | 700-Loan | | 6,000.00 |
| 1/03/05 | 2 | to record a bank's loan | | |
| 2/03/05 | 3 | 200-Inventories | 3,468.00 | |
| 2/03/05 | 3 | 999-Retained earnings | 2,019.56 | |
| 2/03/05 | 3 | 600-Accounts payable | | 5,487.56 |
| 2/03/05 | 3 | inventories and its depreciation | | |
| 3/03/05 | 4 | 600-Accounts payable | 4,653.94 | |

FIGURE 3b

| | Demo Company | | |
|---|---|---|---|
| | TRIAL BALANCE | | |
| | as at November 8, 2005 | | |
| | | DEBIT | CREDIT |
| 1 | Bank | 1 853.74 | |
| 700 | Loan | | 6 000.00 |
| 200 | Inventories | 3 468.00 | |
| 999 | Retained earnings | 2 019.56 | |
| 600 | Accounts payable | | 833.62 |
| 0 | Petty cash | 254.27 | |
| 100 | Accounts receivable | 1 200.30 | |
| 1000 | Sales - product 1 | | 7 000.00 |
| 1010 | Sales - product 2 | | 5 000.00 |
| 1020 | Sales - product 3 | | 3 000.00 |
| 500 | Computer | 10 000.00 | |
| 3000 | Travel charges | 646.35 | |
| 10 | Credit Card | | 400.62 |
| 5000 | Salaries | 2 792.02 | |
| | Totals : | 22 234.24 | 22 234.24 |

FIGURE 3c

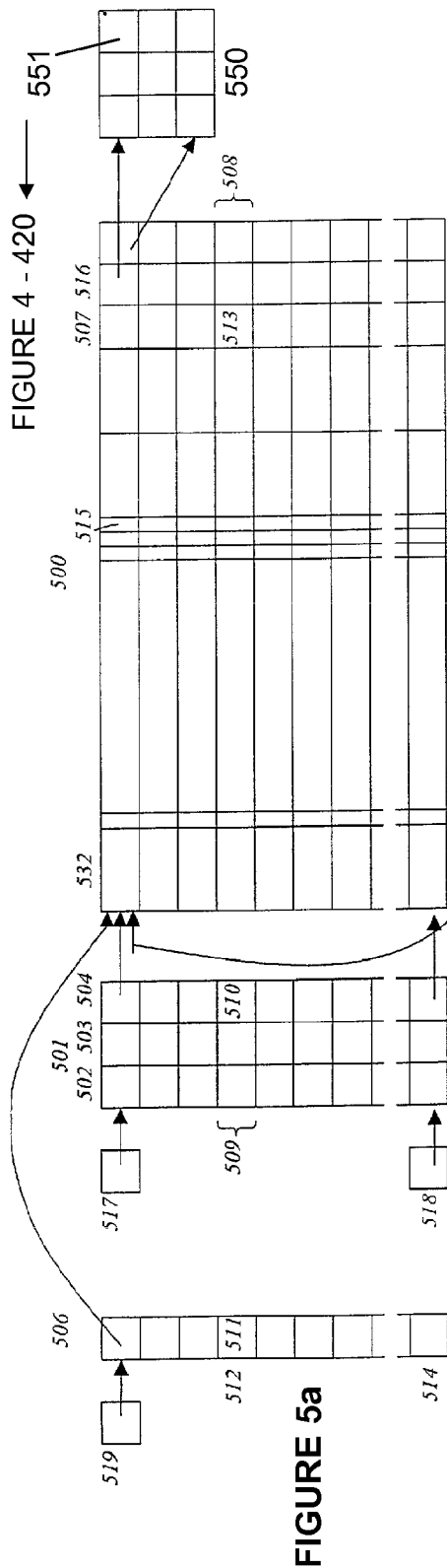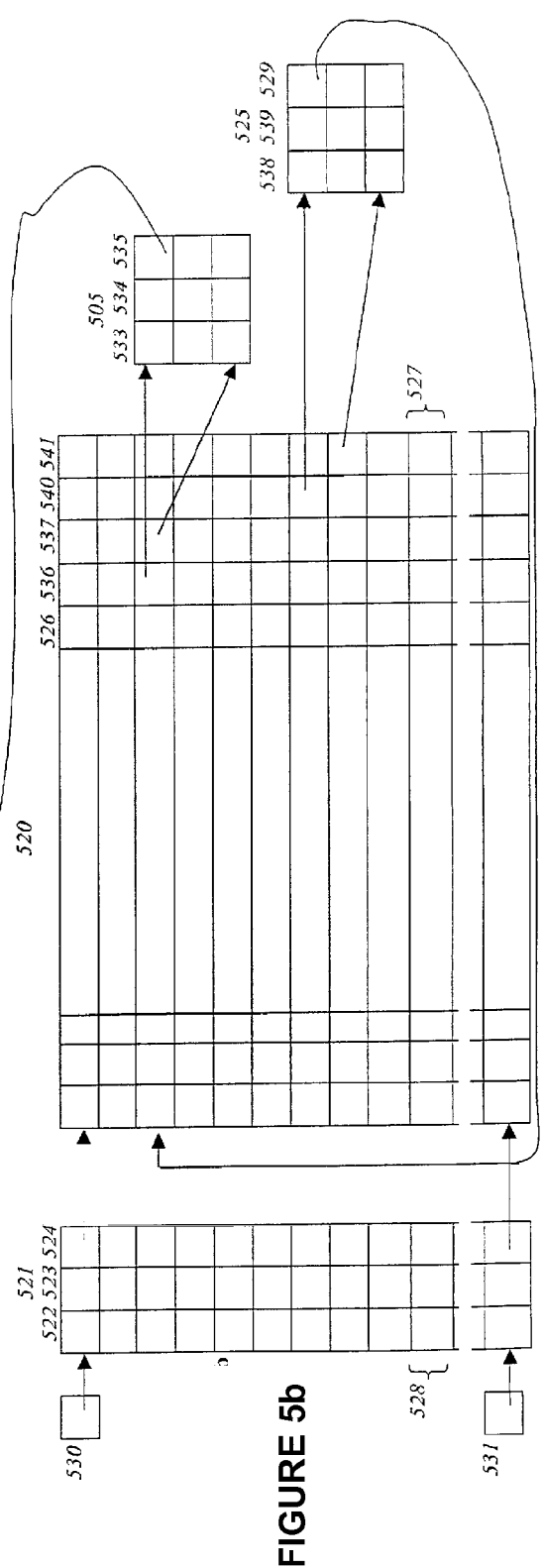
FIGURE 5a
FIGURE 5b

Demo Company

BALANCE SHEET as at June 30, 1999

ASSETS

Current assets
    Cash                         2 707.39   ⎫ 602
    Accounts receivable     1 200.30
    Inventories             3 468.00

7 375.69   ⎫ 606

Fixed assets                   8 500.00

Demo Company

TRIAL BALANCE as at June 30, 1999

DEBIT     CREDIT

0 Cash                 254.27
  1 Bank-current      2 853.74
  5 Credit card                       400.62
100 Accounts receivable  1 200.30
200 Inventories         3 468.00
500 Fixed assets      10 000.00
505 Accrued dep.                  1 500.00

MASTR.DAT

| | | |
|---|---|---|
| biggest_link | : | 40 — 1101 |
| nbr_accts | : | 40 |
| nbr_trans | : | 113 — 1102 |
| carryover_date | : | 730 |
| closing_date | : | 729039 |
| password | : | |
| company_name | : | DEMO COMPANY |
| attribut | : | 7 |
| drive_DAT | : | |
| drive_BCK | : | |
| drive_HIS | : | |
| nbr_files_his | : | 0 — 1103 |

FIGURE 11

CHART.DAT

1201

| | | | | | | |
|---|---|---|---|---|---|---|
| .....0 , | Petty cash | B , | b , | 0.00 , | 0.00 , | 1 |
| .....1 , | Bank | B , | b , | 0.00 , | 0.00 , | 2 |
| ...10 , | Credit card | B , | b , | 0.00 , | 0.00 , | 3 |
| .100 , | Accounts receivable | B , | b , | 0.00 , | 0.00 , | 4 |
| .105 , | C.T.I. | D , | b , | 0.00 , | 0.00 , | 5 |
| .106 , | R.T.I. | D , | b , | 0.00 , | 0.00 , | 6 |
| .200 , | Inventories | D , | b , | 0.00 , | 0.00 , | 7 |
| .500 , | Computer | D , | b , | 0.00 , | 0.00 , | 8 |
| .505 , | Accrued dep.-computer | D , | b , | 0.00 , | 0.00 , | 9 |
| .600 , | Accounts payable | B , | b , | 0.00 , | 0.00 , | 10 |
| .605 , | T.P.S. payable | C , | b , | 0.00 , | 0.00 , | 11 |
| .606 , | T.V.Q. payable | C , | b , | 0.00 , | 0.00 , | 12 |
| .607 , | Taxes - net amount | C , | b , | 0.00 , | 0.00 , | 13 |
| .700 , | Loan | C , | b , | 0.00 , | 0.00 , | 14 |
| .990 , | Capital stock | C , | b , | 0.00 , | 0.00 , | 15 |
| .999 , | Retained earnings | C , | b , | 0.00 , | 34733.00 , | 16 |
| 1000 , | Sales - product 1 | C , | & , | 0.00 , | -90000.00 , | 17 |
| 1010 , | Sales - product 2 | C , | & , | 0.00 , | -70000.00 , | 18 |
| 1020 , | Sales - product 3 | C , | & , | 0.00 , | -30000.00 , | 19 |
| 2000 , | Purchases - product 1 | D , | & , | 0.00 , | 50000.00 , | 38 |
| 2010 , | Purchases - product 2 | D , | & , | 0.00 , | 20000.00 , | 39 |
| 2020 , | Purchases - product 3 | D , | & , | 0.00 , | 10000.00 , | 40 |
| 2090 , | Changes in inventory | D , | & , | 0.00 , | 0.00 , | 20 |
| 3000 , | Travel charges | D , | & , | 0.00 , | 4500.00 , | 21 |
| 3200 , | Sale charges | D , | & , | 0.00 , | 1250.00 , | 22 |
| 3500 , | Advertising | D , | & , | 0.00 , | 9000.00 , | 23 |
| 3600 , | Promotion | D , | & , | 0.00 , | 1000.00 , | 24 |
| 5000 , | Salaries | D , | & , | 0.00 , | 37500.00 , | 25 |
| 5050 , | Insurances | D , | & , | 0.00 , | 520.00 , | 26 |
| 5100 , | Rent | D , | & , | 0.00 , | 9000.00 , | 27 |
| 5200 , | Electricity | D , | & , | 0.00 , | 1500.00 , | 28 |
| 5300 , | Telephone | D , | & , | 0.00 , | 1950.00 , | 29 |
| 5400 , | Stamps | D , | & , | 0.00 , | 570.00 , | 30 |
| 5500 , | Office stationery | D , | & , | 0.00 , | 525.00 , | 31 |
| 5600 , | Capital tax | D , | & , | 0.00 , | 202.00 , | 32 |
| 5900 , | Depreciation - computer | D , | & , | 0.00 , | 100.00 , | 33 |
| 7900 , | Bank charges | D , | & , | 0.00 , | 150.00 , | 34 |
| 7910 , | Interests | D , | & , | 0.00 , | 0.00 , | 35 |
| 8000 , | Other income | D , | & , | 0.00 , | 0.00 , | 36 |
| 9000 , | Income taxes | D , | & , | 0.00 , | 7500.00 , | 37 | nbr of records : 40

FIGURE 12

FINANCIAL STATEMENT FILE

```
                                              1301
                                              |  1302
                                              |  |  1303
                                              |  |  |  1304
1 .  9c              ASSETS.......... 2 .     |  |  |  |
1 . 10c  Current assets............... 2 .    |  |  |  |
1 . 11i    Cash.......................... 0 ,  1,  2,  3, 32767.
1 . 12i    Accounts receivable........ 0 ,   4, 32767.        1305
1 . 13i    Inventories.................. 0 ,   7, 32767.              1306
1 . 14   ------------------------........ 3 .
1 . 15t  ............................... 1 ,   1,  4,  7, 32767.      1308
1 . 16c  ............................... 2 .                     1307
1 . 17i  Fixed assets.................. 0 ,   8,  9, 32767.
1 . 18   ------------------------........ 3 .
1 . 19t  ............................... 1 ,   1,  4,  7,  8, 32767.
1 . 20   ========================........ 5 .
1 . 21c  ............................... 2 .
1 . 22c              LIABILITIES.... 2 .
1 . 23c  Current liabilities............ 2 .
1 . 24c    Accounts payable........... 2 .
1 . 25i      and accrued charges...... 0 ,  11, 12, 13, 15,  6, 10, 32767.
1 . 26c  ............................... 2 .
1 . 27i    Loan......................... 0 ,  14, 32767.
1 . 28   ------------------------........ 3 .
1 . 29t  ............................... 1 ,  11, 14, 32767.
1 . 30   _____........ 4 .
1 . 31c  ............................... 2 .
1 . 32c              EQUITY.......... 2 .
1 . 33i    Capital stock................ 0 ,  15, 32767.
1 . 34i    Retained earnings........... 0 ,  16, 32767.
1 . 35i    Net income................... 0 ,  17, 18, 19, 38, 39, 40, 20, 21, 22, 23,
24, 25, 26, 27, 28, 29, 30, 31, 32, 33, 34, 35, 36, 37, 32767.
1 . 36   ------------------------........ 3 .
1 . 37t  ............................... 1 ,  15, 16, 17, 32767.
1 . 38   _____........ 4 .
1 . 39c  ............................... 2 .
1 . 40t  ............................... 1 ,  11, 14, 15, 16, 17, 32767.
1 . 41   ========================........ 5 .
```

FIGURE 13

Demo Company
BALANCE SHEET
as at June 30, 1999

Assets

Current assets
| | |
|---|---:|
| Cash | 254.27 |
| Bank - current | 2,853.74 |
| Credit card | (400.62) |
| Accounts receivable | 1,200.30 |
| Inventories | 3,468.00 |
| | 7,375.69 |
| Fixed assets | 10,000.00 |
| Accrued dep. | (1,500.00) |
| | 15,875.69 | form feed

Demo Company

BALANCE SHEET as at June 30, 1999

ASSETS

| | |
|---|---:|
| Current assets | 2 707.39 |
|     Cash | 1 231.96 |
|     Accounts receivable | 3 468.00 |
|     Inventories | --------------- |
| | 7 407.35 |
| Fixed assets | 8 500.00 |
| | --------------- |
| | 15 907.35 |
| | ======== |

LIABILITIES

| | |
|---|---:|
| Current liabilities | |
|     Accounts payable | 833.62 |
| Loan | 6 000.00 |
| | --------------- |
| | 6 833.62 |

EQUITY

| | |
|---|---:|
| Capital stock | 1 000.00 |
| Retained earnings | (2 019.56) |
| Net income | 10 093.29 |
| | --------------- |
| | 9 073.73 |
| | --------------- |
| | 15 907.35 |
| | ======== |

Demo Company

BALANCE SHEET as at June 30, 1999

ASSETS

Current assets
Cash                        254.27
Bank - current          2 853.74
Credit card                (400.62)
Accounts receivable   1 200.30
Inventories               3 468.00
                          ―――――
                          7 375.69

Fixed assets            10 000.00
Accrued dep.             (1 500.00)
                          ―――――
                         15 875.69
                         ══════

Demo Company

BALANCE SHEET as at June 30, 1999

ASSETS

Current assets
Cash                     2 707.39
Accounts receivable     1 200.30
Inventories              3 468.00
                         ―――――
                         7 375.69

Fixed assets             8 500.00
                         ―――――
                        15 875.69
                        ══════

Demo Company account balance detail — 2005 from June 1 1999 to June 30 1999

— 2006

2008 —— 80- TPS receivable    Dr    Balance carried over    0.00+D

| | Date | Docum | Acct | Description | Amount |
|---|---|---|---|---|---|
| 2009 | 1/06/99 | 102 | 1 | XYZ company | 20.86+D ← 2001 |
| | 1/06/99 | 101 | 80 | ref: general journal | 10.80+D |

2004
2003

2007

Balance as at 30/06/1999      31.66+D ← 2002
=====

| Demo Company | | | | |
|---|---|---|---|---|
| Document Detail | | | | |
| Date | No | Allocation | DR | CR |
| 1/03/05 | 2 | 1-Bank | 6,000.00 | |
| 1/03/05 | 2 | 700-Loan | | 6,000.00 |
| Totals : | | | 6,000.00 | 6,000.00 |

FIGURE 22a

1 Bank - current — 2504

| Date | Docum | Acct | Description | Amount | |
|---|---|---|---|---|---|
| 30/06/99 | 102 | 2000 | xyz entreprise | 199.00 | ✓ |
| 30/06/99 | 102 | 2010 | xyz entreprise | 74.25 | ✓ |
| 30/06/99 | 102 | 2020 | xyz entreprise | 24.75 | ✓ |
| 30/06/99 | 102 | 680 | xyz entreprise | 20.86 | ✓ |
| 30/06/99 | 993006 | 0 | cash deposit | 1 000.00 | + |
| 30/06/99 | 103 | 5060 | supplier 2 | 154.25 | − |

30/06/99 — 2509

Book balance: 2 853.74 — 2503
+ cheques o/s: 165.05 — 2505
− deposit o/s: 1 000.00 — 2506
Bank statement: 2 018.79 — 2507

Total document # 102 : 318.86 — 2508
318.86

READING, ORGANIZING AND MANIPULATING ACCOUNTING DATA

RELATED APPLICATIONS

This application is a divisional of U.S. Utility patent application Ser. No. 11/562,007, filed Nov. 21, 2006, for "Reading, Organizing and Manipulating Accounting Data, which is a continuation-in-part of U.S. Utility patent application Ser. No. 09/736,345, filed Dec. 15, 2000, for "Financial Statement Module", which claims the benefit of U.S. Provisional Patent Application No. 60/172,587, filed Dec. 20, 1999, for "Financial Statement Module". Each of these applications is incorporated herein by reference.

FIELD OF THE INVENTION

The invention relates to a process, a method and system for reading, organizing, and manipulating accounting data to create financial reports.

BACKGROUND OF THE INVENTION

Accounting consists of measuring, taking record of, and communicating the financial data concerning operations relative to the financing, the investments and the running of a business or enterprise. The communication of the information is typically done via financial reports, which are an outcome of the accounting process. The purpose of financial reports is to provide pertinent information for the making of decisions concerning the optimal operation of a business. The presentation should have enough detail to minimize errors, and should include complementary notes and additional information necessary for a complete and faithful representation of the financial situation of a business at a precise date. It should also provide for a comprehensive picture of the business productivity for a given period of time. This presentation can vary according to the needs of the reader such as creditors, investors, shareholders, directors, governments, employees, and the general public as well as according to the type of business and industry. In many instances a user desires a customized financial report.

Accounting software systems usually output an informal draft or only a portion of a financial report which can be used, for example, by the directors. The income statement and/or the balance sheet must typically be used without the complementary notes and the additional information, therefore limiting the usefulness of the statement. The user is also limited by the accounting software's rigid framework, which is pre-established, fixed and limits the user to one type of presentation. Also, the consultation of these financial reports on a screen or display is typically limited to the report itself and the user is unable to find the source of the information.

For clarification purposes, it is useful to understand the differences between building financial statements and general bookkeeping, as preparing financial reports is a distinct and subsequent process to bookkeeping. The preparation of financial reports is a much more involved and regulated task as compared to bookkeeping.

The structure of most present accounting systems is based upon the setup of the Chart of Accounts, wherein the Chart of Accounts is the master list of all Accounts. For example, a typical bookkeeping software product allows for the creation and maintenance of a chart of accounts, entering of transactions, and the printing of reports—one step after the other. By way of example, one of these systems output the 'Balance Sheet' and the 'Income Statement' which are identified as "Financial Statements", via the controlled sequential printing of this master list of accounts with account balances (the trial balance) along with the addition of sequential fictional accounts. These state of the art accounting software applications, thus requires a pre-defined chart of accounts in order to function. Any data that is imported within these systems require the structure according to the established chart of accounts in order to be processed. In some systems, the user builds the chart of account and creates the structure.

One advantage of such accounting financial statements is that they are integrated with the accounting system, such that a modification in the data of the accounting system automatically modifies the financial report. Some report generators offer more flexibility but typically less integration. The generators become more and more complex as they attempt to be less rigid and more integrated because the computer designers lack a comprehension of the field of accounting and the requirements of the accounting field.

In the accounting industry, accountants typically receive accounting data in different forms and produced by different products. And, the accounting person has to take the accounting data and prepare financial reports, typically starting with the trial balance resulting from the bookkeeping process, making adjustments to account balances in accordance with the generally accepted accounting principles (GAAP), preparing financial reports by performing the grouping of accounts into financial statement items to be presented under categories of items, and generating reports and financial reports by hand. A word processor is then often used to produce final and complete financial reports along with explanations such as auditor's report. And, the word processor typically has no integration with the accounting data of the accounting system. While the industry is replete with products and tools for bookkeeping, there were no universal tools offering the flexibility and capacities of a word processor while integrating accounting data, to perform such processes and facilitate the work done by accounting persons such as accountants, financial officers, and auditors.

What is needed is a universal tool that would allow reading of any type of accounting data and easily manipulate that data into some type of financial report. This would allow an accounting person to read data from any of the bookkeeping software packages and easily derive any financial reports. It would therefore be useful and innovative if the knowledge about accounting and the operation of computers would be unified to produce a tool which enables accounting systems and word processing applications to create all kinds of financial reports tailored to the needs of the user, in a simple way, and without following a rigid framework. The processing and the integration with the accounting data of such a system would permit tailored financial reports.

SUMMARY OF THE INVENTION

One embodiment of the invention is an organizational data structure for accounting data with a trial balance data structure including a plurality of trial balance data structure elements containing accounts of the accounting data, wherein the trial balance data structure elements are linked by a distinct doubly linked list of trial balance data structure elements pointers, and further comprising sub-lists of trial balance data structure elements pointers to group the accounts of the accounting data into financial statement items.

In a further embodiment, memory spaces for the trial balance data structure elements are dynamically allocated, the distinct doubly linked list including a next pointer, and a previous pointer.

Additionally, each of the trial balance data structure elements may include a LINKTRANS field storing a corresponding LINK vector element sequential number, and wherein each element of the LINK vector is a memory address of the trial balance data structure elements.

The data structure can further comprise a transaction data structure including a plurality of transaction data structure elements containing transactions associated with the accounts and linking the transactions to respective accounts, wherein the transaction data structure elements are linked by a doubly linked list of transaction data structure elements pointers. Another embodiment includes wherein each of the transaction data structure elements includes a LINKCHART field having an associated LINK vector element sequential number, each element of the LINK vector being a memory address of the trial balance data structure elements. The data structure may further comprise a displayline data structure including displayline data structure elements, the displayline data structure elements linked by a doubly linked sub-list of displayline data structure element pointers, linking each of the transaction data structure elements to corresponding trial balance structure elements.

In accordance with one embodiment, the data structure further includes a financial statement data structure having financial statement items, wherein a set of financial statement data structure elements of the financial statement data structure are linked by a distinct doubly linked list of financial statement data structure elements pointers, and wherein the financial statement items are grouped into totals using sub-lists of financial statement data structure elements pointers.

The data structure additionally includes wherein the sub-lists of trial balance data structure element pointers are doubly linked lists, and wherein grouping the accounts into one or more financial statement items includes a pointer of a first element of each of the sub-lists of trial balance data structure element pointers which is stored in the financial statement data structure.

A further aspect includes wherein the sub-lists of financial statement data structure element pointers are doubly linked lists, and wherein grouping the financial statement items into one or more totals includes a pointer of a first element of each of the sub-lists of financial statement data structure element pointers stored in the financial statement data structure.

Another embodiment is a system for building customized financial statements, includes a read module for retrieving raw accounting data and selecting accounting data elements. There is a data organization module for creating a plurality of doubly linked data structures and storing the accounting data elements. A report generator builds financial statements from the accounting data elements. And, a processing unit is coupled to the read module, the data structure module and the report generator with at least one memory resource coupled to the processing unit.

The system includes wherein the certain accounting data elements includes at least an amount, an account, and an accounting direction.

The system may further comprise at least one of a display module, a printing module, an optimization module and a reconciliation module. The memory resources may be selected from at least one of the group consisting of: random access memory (RAM), read only memory (ROM), and flash memory.

The report generator may include a reporting algorithm including page headers and formfeed.

A further feature is identifying preformed manually by establishing field boundaries about at least some of the accounting data. Alternatively, if certain properties of the accounting data are known, the identifying can be performed automatically.

The system may further comprise at least one of an insertion algorithm for adding a new element to the doubly linked data structures or a destruction algorithm for removing an element from the doubly linked data structures.

The system may include wherein retrieving is selected from at least one of the group consisting of: scanning of paper files and reading with optical character recognition (OCR), importing from any accounting system, manually entering, inputting as an electronic file, using a Print command of a software program, and from an export or 'save as' function of a software program.

An additional embodiment includes an accounting reconciliation system, with a register containing transaction data of a control account, wherein a theoretical account balance is displayed to a user on a display screen of a computer with a dynamic total of a respective balance of the control account and a set of reviewed transactions of the control account; and wherein the user compares the theoretical account balance to an external transactions report account balance. The system according to one further aspect includes wherein the reviewed transactions are manually checked.

One embodiment of the present invention is a system that provides a financial statement module that can create any type of financial report for any type of business and which can be integrated with any accounting system capable of producing a trial balance, therefore answering the needs of customers for a faithful and complete presentation of the financial information. The Financial Statement Module, with its organization of the accounting data in memory in conjunction with the display module and the algorithms, manipulate the data structures to group the accounts' balances into financial items and to group financial statement items' balances into totals, and thus build financial reports Another embodiment of the present invention is to provide a financial statement module which can put the balances of the trial balance in order to comply with conventional accounting principles before building the financial report.

Yet another embodiment of the present invention is to provide the details of any balance, obtain the source of any balance, and to manipulate the information contained in these details for verification purposes, including sorting of data, grouping of data, reporting of inflows, reporting of outflows, and reconciling.

Another aspect of the present invention is to create a financial statement module in which the financial or accounting information is organized and displayed as a balance sheet to put the emphasis on its financial situation, by showing the resources of the business, its obligations and its assets, and complementary notes necessary for a faithful and complete presentation.

Another feature of the present invention is to create a financial statement module which can build and display an income statement to give to the user a tool for evaluating the economical performance, for a given period of time, of the business, by putting the emphasis on the net profit, which is the surplus of the revenues over the expenses—increasing or decreasing the equity—and enables a classification according to the type of business and the nature of its revenues and expenses and the presentation of additional information.

Also, another aspect is to provide a statement of the source of funds and the usage of these funds to show the movement of the funds for a given period of time, that is, the operations relative to the financing by distinguishing between the funds coming from the exploitation and the funds coming from other sources, such as loans, capital contribution and investment operations.

A further embodiment is to display a statement for each fund of an accounting by funds of a non-profit-making organization. Another aspect is to display the information in any other type of report in order to answer the needs of the users.

In one embodiment, the data structure module comprises distinct doubly linked lists in which NEXT, PREVIOUS and structure pointers are stored, whereby the manipulation of the data is flexible.

Another feature includes a report generator that displays the accounting data which was organized by the data structure module line by line, using parameters set by the user.

According to a another aspect of the present invention, the financial statement module comprises a detail request module which produces secondary reports containing the details of a financial statement item, the details of an account balance or the details of a document.

According to another aspect of the present invention, a method of producing financial reports customized to the likes of the user is provided. The method comprises the steps of: providing a set of accounting data, organizing the accounting data using doubly linked lists into memory of a computer and generating a financial report.

According to another aspect of the present invention, organizing the accounting data comprises saving the accounting data in separate files on an external memory unit, wherein the accounting data can be reconstituted using the separate files.

According to still another aspect of the present invention, a method of producing financial reports customized to the likes of the user is provided further comprising choosing an element, such as a financial statement item, an account balance or a document, for which details are requested, providing a detail request module which fetches all information concerning the element from the accounting data and displaying the information into a secondary report.

In accordance with another embodiment, the invention provides a method for generating a financial report is provided, comprising the steps of: selecting a type for a financial statement line, storing a data set of lines as selected in the previous step, generating a financial report using accounting data in accordance with the line data.

Another aspect of the present invention, a method for generating a financial report is provided, including displaying the financial report and printing the financial report.

According to a further aspect of the present invention, there is provided a financial statement generator having a line selector for selecting a type of line and editing the line, a memory unit for storing a data set of lines as selected, a report generator for generating a financial report using the data set of lines and accounting data.

In addition, there is provided a financial statement generator further comprising a detail selector for selecting a line for which details are requested using the accounting data and a display module for displaying the detail information.

According to a further aspect of the present invention, there is provided a financial statement generator including a display module for displaying the financial report and a printing module for printing the financial report.

According to still a further aspect of the present invention, there is provided a stand-alone financial statement module to be used with a word processor. Using the word processor, the user fills in the appropriate information with a data entry window and the auxiliary screens of the financial statement editor.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3a is a representative example of transaction data according to one embodiment of the invention;

FIG. 3b shows the reading of the general journal from FIG. 3a into the system in accordance with one embodiment of the invention;

FIG. 3c shows the trial balance from the general journal reading from FIG. 3b, according to one embodiment of the invention;

FIGS. 5a and 5b illustrates organization of the data structures in the memory of the computer according to one embodiment;

FIG. 6a is a partial representative example of a trial balance according to one embodiment;

FIG. 6b is a partial representative example of a balance sheet according to one embodiment;

FIGS. 10a and 10b illustrate an example of the contents of the data structures in the memory of the computer according to one embodiment;

FIG. 11 is an example of the contents of the file MASTR.DAT;

FIG. 12 is an example of the contents of the file CHART.DAT;

FIG. 13 is an example of the contents of a financial statement file;

FIG. 14 illustrates an example of the contents of the display data structure according to one embodiment;

FIG. 18 is an example of a financial report according to one embodiment;

FIGS. 19a and 19b show an example of the detail option at the financial statement item level according to one embodiment;

FIG. 20 is an example of the detail option at the balance level according to one embodiment;

FIGS. 22a and 22b illustrates the detailing of the accounting data according to one embodiment;

FIGS. 25 is a screen display showing the reconciliation module according to one embodiment.

DETAILED DESCRIPTION

Generally, the present invention provides a method and system for reading, organizing and manipulating accounting data and for producing financial reports customized to the preferences of the user.

To aid in the comprehension of the present invention, it is helpful to note the widely accepted definitions for the following terms of art: an "account" is a grouping of transactions (debits and credits) that determine the net balance of the account; a "chart of accounts" is a list of accounts; a "financial report" is a broad term for reports with financial figures; a "trial balance" is financial report comprising a list of accounts with respective balances, where the balances result from the bookkeeping process of recording of transactions into accounts; a "financial statement" is a financial report, such as a balance sheet, an income statement, a statement of retained earnings, or a cash flow statement (similar types of financial statements exist for "not-for-profit" organizations as well); and a "financial statement item" is a group of accounts that determine the net balance of the financial statement item, wherein an account is a grouping of transactions (debits and credits) that determine the net balance of the account.

The present invention includes hierarchal levels of data used in a financial report, wherein the hierarchal levels of data are as follows: Debits and Credits (which are amounts related to an economic event such as the sale of goods) provide one level of data; a Transaction is an economic event that can be recorded in an accounting system by a combination of Debit-Credit or Debit-Credit-Credit or Debit-Debit-Credit, etc (in accordance with the double entry accounting principle (note that, the net balance of such combination is zero)) and provides a next level of data; an Account provides a next level of data, and is a group of Debits and/or Credits from Transactions that determine the net balance of the account according to the accounting equation; a Financial Statement Item provides a next level of data, and is a group of Accounts that determine the net balance of the financial statement item; and a Total of Financial Statement Items provides a next level of data, and is a group of Financial Statement Items that determine the net balance of the Total.

Figure 1:
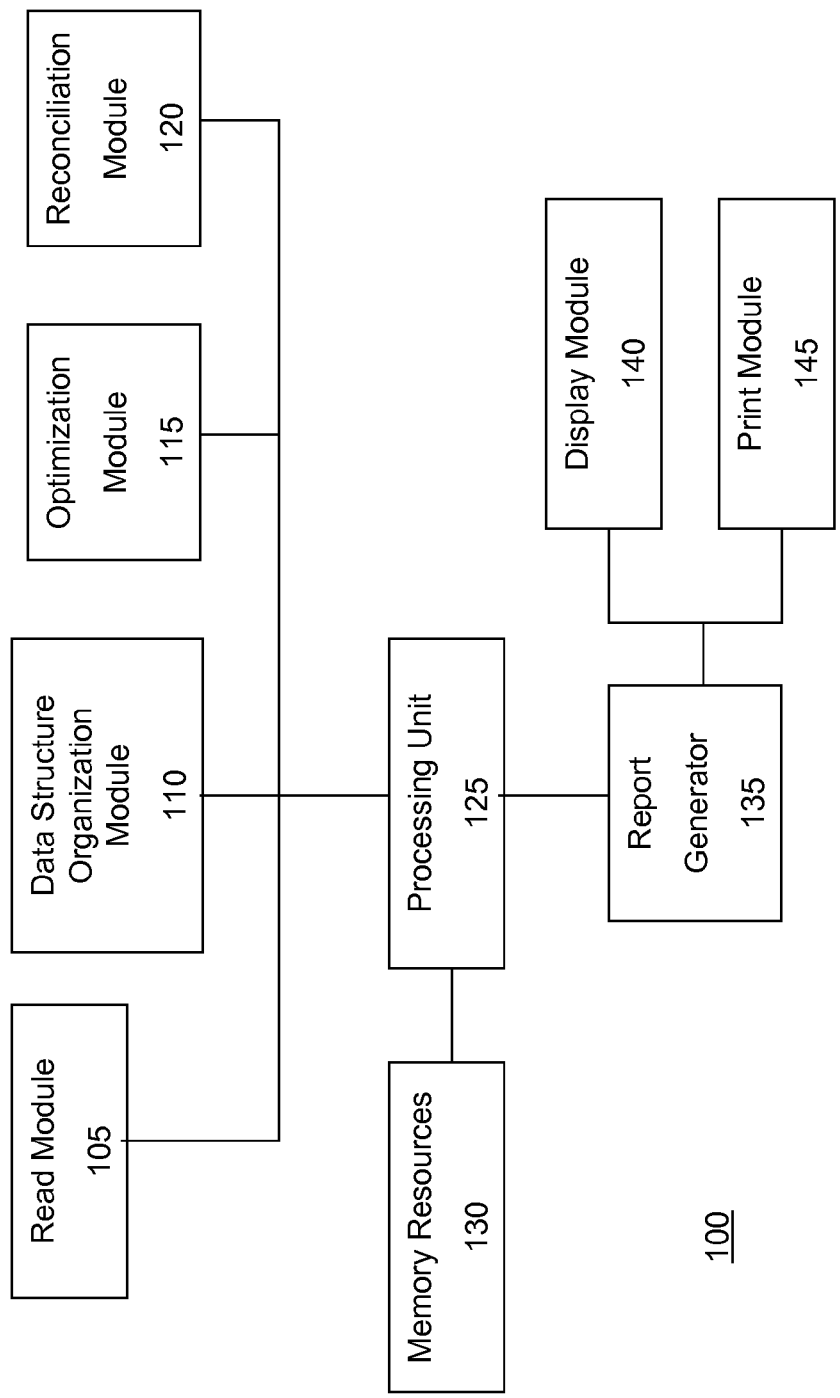
FIG. 1 is a top level system block diagram according to one embodiment of the invention.

Referring to FIG. 1, one embodiment of the system is depicted having a number of modules coupled to a computing processing unit. The system 100 includes a Read Module 105 that will allow the reading of accounting data. This accounting data can be manually entered, but typically will come from an electronic file and may come from any accounting system. An electronic file of accounting data can have many different fields of data and formats. Such an electronic file of underlying accounting data can originate from a number of resources, such as from a Print command of a software program; from an export or 'save as' function of a software program; from a scanning process that may include optical character recognition (OCR); and from manually entered data saved into an electronic format. By way of illustration of one embodiment, the present invention reads an electronic file, such as an ASCII file that can be 'saved as' or be easily generated by a Print command and stored on a computer readable medium or memory resource. The term 'computer readable medium' is given the broad definition as known to those in the industry. No matter how the data is read into the system, the present invention can build financial reports.

Regardless of where or how the input and read accounting data file was generated—it contains 'raw accounting data' which includes at least a plurality of amounts, wherein each amount has an accounting direction and a corresponding account. The read module 105 'reads' the raw accounting data and identifies the accounting data desired for processing. The identification process can be manual, semi-automatic or automatic. Present accounting systems are unable to process such raw accounting data due to the data structure and framework constraints. As noted, the state of the art systems are unable to receive an electronic file of accounting data having only such raw data as an amount and a corresponding account as they would not be able to process this information.

There is a Data Structure Organization Module 110 that will organize the read and identified accounting data into the Memory Resources 130 by dynamically allocating memory spaces for a plurality of doubly linked data structures for storing elements of the accounting data, wherein the allocating is performed for each data structure element and returns an individual memory address called a pointer. The data structures are doubly linked by the storage of the pointer of a next element and the pointer of a previous element in the data structure element.

This includes dynamically allocating memory spaces for a doubly linked transaction data structure for storing, for example, transaction amounts, associated with the accounts, and linking the transaction amounts to their respective accounts. This may further include storing the transactions into transaction data structure elements, wherein each of the transaction data structure elements include a LINKCHART field, where will be stored an associated LINK vector element sequential number, each element of the LINK vector being a memory address of the trial balance data structure elements, and wherein storing transactions into the doubly linked transaction data structure may further includes dynamically allocating central memory spaces for displayline data structure elements, each of the displayline data structure elements associated with a corresponding transaction data structure element.

This also includes dynamically allocating memory spaces for a trial balance data structure for storing the accounts of the accounting data, and linking trial balance data structure elements with a doubly linked list of pointers thereby allowing sub-lists of pointers to group the accounts into financial statement items; and further includes storing trial balance data into trial balance data structure elements, each of the trial balance data structure elements including a LINKTRANS field, storing a corresponding LINK vector element sequential number, each element of the LINK vector being a memory address of the trial balance data structure elements, and further includes linking each element of the transaction data structure to a corresponding element of the trial balance data structure with a doubly linked sub-list of displayline data structure element pointers, a pointer of the first element of this list being stored in a trial balance data structure element.

This also include dynamically allocating memory spaces for a financial statement data structure for storing the financial statement items, and linking financial statement data structure elements with a doubly linked list of pointers thereby allowing sub-lists of pointers to group financial statement items into totals, and further includes storing financial statement data structure elements, the financial statement data structure elements including a LINE type field for each element of the financial statement, each LINE type field specifying a type attributed to the corresponding financial statement data structure elements.

A further feature includes an Optimization Module 115 that can optimize the loading of the accounting data. The double entry accounting principle requires a debit and a credit, and very often most of the amounts corresponds to one or a few control account for one of the two portions, for example, a bank account, an account receivable, an account payable, etc. Therefore, for the majority of the amounts, typically there are one or a few common denominators. By identifying these few control accounts, the system can link the debit and the credit of a transaction by storing both in only one transaction data structure element.

In one embodiment where control accounts have been identified, it is possible to further process the data with the Reconciliation Module 120, which lets the user check each one of the amounts of a corresponding control account, in the case where the user wants to compare with a document (a bank statement for example). The Reconciliation Module 120 uses the account balance to calculate and display a theoretical account balance (a theoretical bank statement balance for example) throughout the process of checking the amounts, so the user does not have to wait for the printing of the reconciliation report to know if the balance of the account in the books has been reconciled successfully (with the balance of the bank statement for example) and to go back to the checking process if not, and so on. When this theoretical account balance equals the document balance (the bank statement balance for example) the user knows that he/she has succeeded in his verification task and can then print the reconciliation report.

The system has a Processing Unit 125 that is a computing device which refers to any computing device having a microprocessor, such as a mainframe, server, laptop, personal computer, tablet, personal digital assistant and such related computing devices.

The system also uses at least one type of Memory Resources 130, which can be a computer's central memory and/or any other storage mechanism. Thus, as used herein, memory resources 130 refer to any storage mechanism used by a computer such as disk memory (internal or external), random access memory (RAM) family, read only memory (ROM) family, and hybrid memories such as flash memory and electrically erasable programmable read-only memory (EEPROM). The design criteria and available computer hardware may determine which the type of memory will be used. Furthermore, multiple memory resources 130 can be used for a single application depending upon the circumstances.

The system includes a Report Generator 135 that generates various flexible types of financial reports from the data read, organized, and stored in the memory resources. As described elsewhere, this includes the usage of page headers and form-feeds to any report.

For example, the system will provide financial statements that include each financial statement item and its respective balance. While consulting the report on the screen display, the system can provide, from the user display of the financial statement, a first level of detail for a user selected financial statement item on the user display, the first level of detail including any accounts and respective account balances grouped into that financial statement item.

While consulting the first detailed report on the screen display, the system can provide, from the accounts and respective account balances grouped into the user selected financial statement item on the user display, a second level of detail for a user selected account on the user display included in the selected financial statement item, the second level of detail including the account balance and transactions amounts associated with the account balance.

While consulting the second detailed report on the screen display, the system can provide, from the account balance and transactions associated with the account balance, a third level of detail for a user selected transaction included in the selected account on the user display, the third level of detail including at least one debited account and a corresponding credited account associated with the selected transaction.

For another example, the system will provide a trial balance report that includes a list of accounts with respective balances, While consulting the trial balance on the screen display, the system can provide, from the accounts and respective account balances, a detail report for a user selected account on the user display, the detail including the account balance and transactions amounts associated with the account balance.

While consulting the detail report on the screen display, the system can provide, from the account balance and transactions associated with the account balance, another level of detail report for a user selected transaction included in the selected account on the user display, this detail report including at least one debited account and a corresponding credited account associated with the selected transaction.

The system builds the reports by creating distinct doubly linked list of displayline data structure element pointers and includes form feeds and headers as required for each page of the report, according to a new universal reporting algorithm. If the user chooses to have a transactions report presenting transactions in a sorted manner, each element of the distinct list of pointers will be inserted in the list according to the sorting parameter selected, so no sorting will be necessary to provide this sorted presentation. In the case where the data organization has been optimized, it is possible to obtain for a selected control account a report containing just the debits or a report containing just the credits. The system can also group rapidly, without any sorting, the transactions by allocation account. It is also possible to obtain a report combining the debits and the credits. Such report can be used by the Reconciliation Module.

In one embodiment, the system includes a Display Module 140 to display the various reports, menus and auxiliary screens (pop-ups), and the manipulation done on this display such as selection from such user display.

The system comprises a Print Module 145 to print the various reports on any printer. According to one embodiment, the printer module 145 processes the data structure on a character-by-character basis and prints the ASCII characters as they appear on the display. In this example, the displayed accounting information will be printed just as it appears in the display, regardless of the printer or printer drivers.

In one embodiment, the Print Module 145 prints reports on any printer using a conversion vector to convert the ASCII code of all characters to print within ASCII codes 32 to 126, standard to all printers eliminating the need for an installation step for the printer. This enables the user to initialize this conversion vector for specific printers. Also permits partial printing according to a partial display. The conversion vector ASCII range can be modified depending upon the type of characters that are to be printed.

Figure 2:
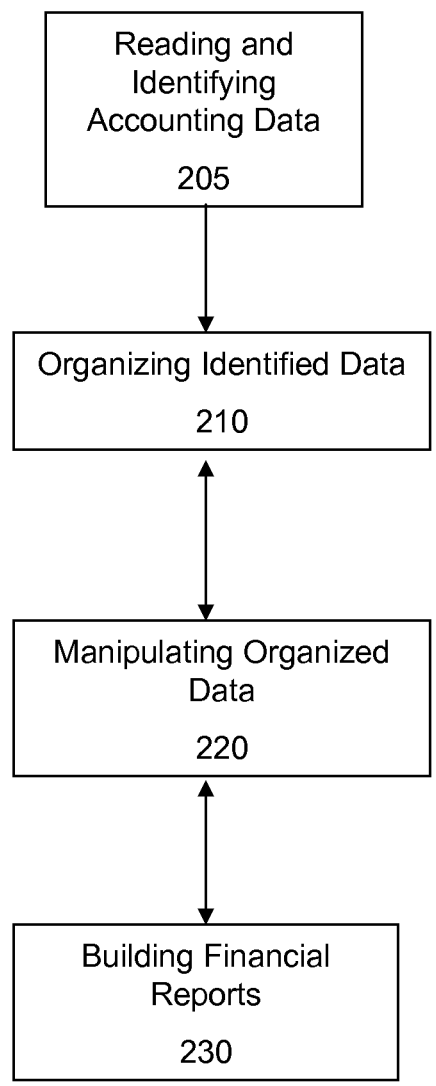
FIG. 2 is a top level flow chart according to one embodiment.

As shown in FIG. 2, the system will read, organize and manipulate any accounting data of any accounting system. The first step 205 consists in reading such accounting data and identifying the data to be organized. This accounting data can be manually entered via a data entry screen, but typically will come from an electronic file. Regardless of where or how the electronic file was generated, as long as such raw accounting data has an amount with a corresponding account, the system can organize and process the data up to the building and printing of customized financial statements. By way of illustration of one embodiment, the present invention reads an electronic file, such as an ASCII file containing a transactions report or a trial balance report that can be 'saved as' or be easily generated by a Print command. Amounts and corresponding accounts, being universally available on such reports, can be identified from the accounting data.

The accounting data can arrive in various forms and flavors. Prior to reading the accounting data into the system, the trial balance data structure is empty, so there is no predefined set up. In order to fill the data structures, the accounting transactions data is read and identified by the system.

In one embodiment the accounting data is a transactions report such as shown in FIG. 3a. This report includes the header information noting the date, number, description, and the amount of debit or credit that contains accounting transactions (debits and credits combinations) which are general journal entries. This register report is part of the accounting books produced by an accounting system. In one embodiment, the system will read this file and allows the user to identify the data to be organized. This is just one example of a transactions register for illustrative purposes. The present system can import or otherwise process any accounting data such as transactions data and trial balance data. In one embodiment the transactions report is from any accounting system and has been established via a Print command to obtain a simple and standard ASCII file, however the data can be imported in many different forms and this example is used for illustrative purposes.

As shown by FIG. 3b, the system read and displays the content of the file and allows the user to move field boundaries 301 identifying such data fields as: Date 302, Document identification 304, Allocation account identification 306, Allocation account description 308, Debit column 310, and Credit column 312. In a working example, the keys <left_arrow>, <right_arrow>, <enter>, <Tab>, <Shift_Tab> are used to determine the beginning and the end of each data field, identifying the data that will be organized. This allows a user to identify which accounting data items to process. In another embodiment, there is some knowledge of the input accounting data and the system can automatically identify and process the input data.

Thus, the transactions report of FIG. 3a is read into the system. In this example, the adjustable fields include the date field 302, document number field 304, account number field 306, account title field 308, debit column field 310, and credit column field 312, however other fields can be used. These fields can be pre-established according to the known parameters of the layout and structure incoming accounting data. It is also within the scope of the invention to have adjustable fields for the read data so that the user can set the start and stop boundaries for each of the desired parameters. Thus the accounting data imported or read by the present invention may include multiple data fields and the user can select which fields to process and set the beginning and the end of each data field from which the data structures will be initialized.

Flexibility and the ability to customize financial reports are one the main functions of the present invention. For example, the debits and credits amounts could be presented in the same column, with a minus sign or parentheses for the credits amounts. Various other features include the ability to enter a date in a desired format such as day/month/year. The system initializes the data structures according to the identification of each data field. Thus, all the transactions lines in the transactions report that have an amount (Debit or Credit), are read and transferred into the data structures, according to the field boundaries.

Referring to FIG. 3c, a Trial Balance resulting from the reading and identifying process is displayed. Note that the accounts are in the order of their first appearance in the accounting data received in this embodiment. It should also be noted that in this example, the total for Debits and Credits ($22,234.24) of the trial balance is different from the total of the transactions ($58,879.57) from FIG. 3a wherein the trial balance shows the computed account balances resulting from one or more transactions combining debits and credits that increase/decrease account balances according to the accounting equation.

Next step, the system organized the identified data 210. Following this process, and continuing in this example, all the transactions lines in the transaction report printed in the ASCII file that have an amount (Debit or Credit) has been read and transferred into the data structures of FIG. 4.

The system also initializes the data structure of FIG. 5a according to the user identification of each data field. Note that the accounts will be stored in the order of their first appearance in the accounting data received. In this example, in the order of their first appearance in the register report as shown in FIG. 3c. As noted, no predefined sequential order is used.

The next step 220 manipulates this organized data. It is possible to record or modify if desired the organization and contains of the trial balance data structure FIG. 5a via a data entry screen. From this organized data, it is possible to organize the financial statements data structure as represented by FIG. 5b. The process of building customized financial statements from the identified data, without any framework to respect, making the distinction between two types of balances appearing on a financial statement, will be described in detail herein from FIG. 6 to FIG. 9.

The next step 230 consists on building the financial reports from this identified and organize accounting data. These financial reports can be customized by the user to provide the desired accounting information and with the level of detail desired.

No matter where the data comes from and how the data is read into the system, the present invention can organized such raw data as an amount with a corresponding account and build financial reports, including financial statements.

Figure 4:
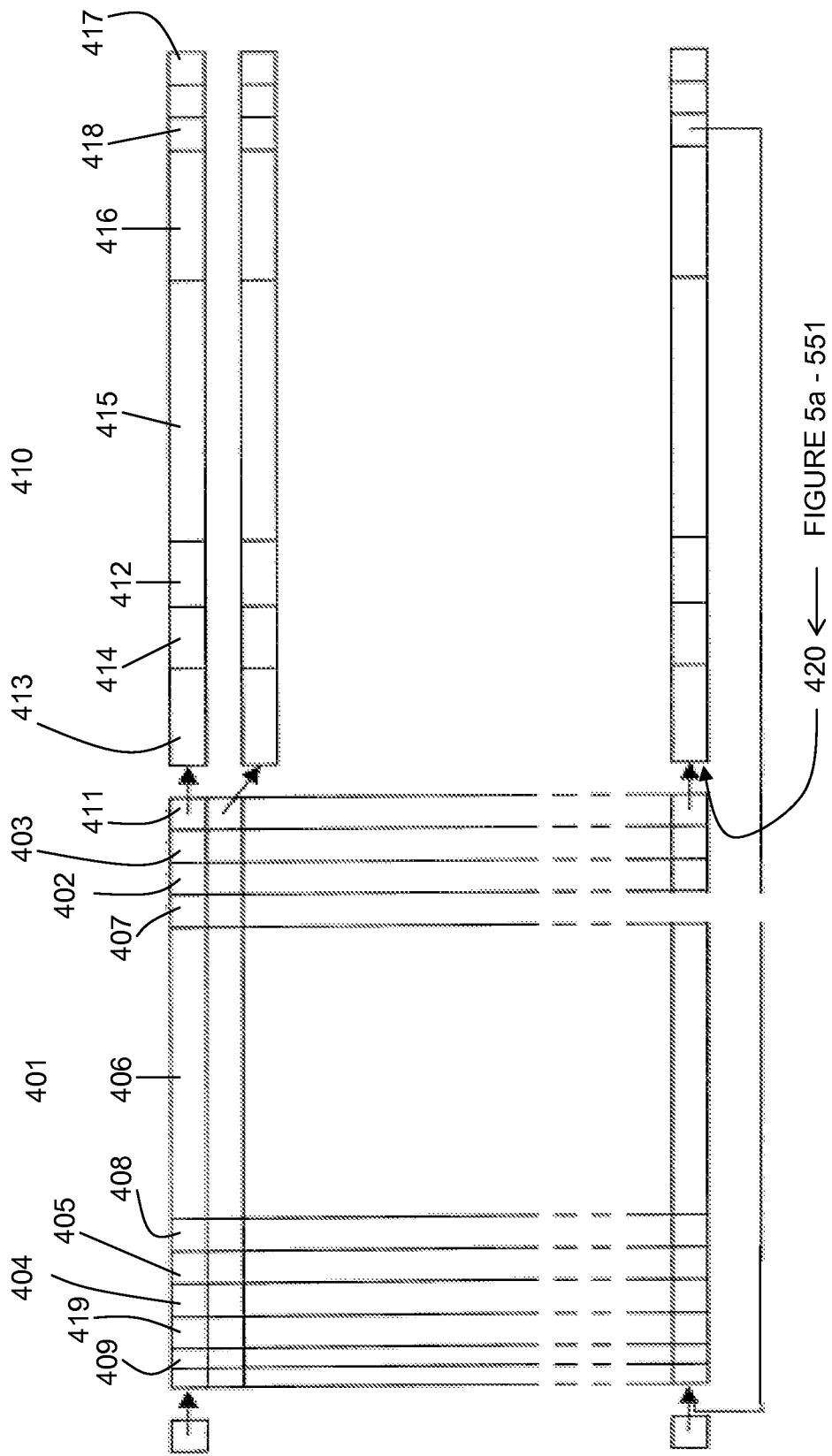
FIG. 4 illustrates the organization between the transaction data structure and the display structure according to one embodiment.

As described earlier in FIG. 2 at step 205, accounting transactions listed on transactions reports by accounting software can be read by the system. Referring also to FIG. 4, the system uses the available data, which is in fact almost standard for all accounting transactions, to store the date of the transaction 404, the document number 405 (initialized to nil if none), a description of the transaction 406 (initialized to nil if none), and the amount 407 with its direction (debit or credit). The amount stored is always positive. Its accounting direction, debit or credit, is stored in the journal field 409 of the transaction structure. A value of 3 indicates that the allocation account is debited of the whole amount. A value of 4 indicates that the allocation account is credited by the amount. The system loads as much accounting transactions as possible in the memory resources of the computer. The system dynamically allows memory space and, because the capacity of the memory varies according to the computer used, the number of transactions loaded in the computer will vary according to what type of computer is used.

For each accounting entry, the system uses the number of the account or the title of the account, available on all accounting books and financial reports, to link the transaction to the corresponding account of the trial balance data structure 500 by storing its LINKTRANS 507 in the field LINKCHART 408 of the transaction structure. The LINKCHART, which corresponds to the LINKTRANS of the trial balance data structure, is the index of the LINK vector 506 where is found the pointer of the trial balance structure for the allocation account of this transaction.

In the transaction structure, the transaction date 404 is stored in Julian date format. The Julian date corresponds to the number of days since the beginning of our era. It is calculated by multiplying the number of years by 365 to which result is added the number of additional days for each of the previous leap years, calculated by dividing by four the number of years minus one to which result we add the number of days for each of the months of the current year and are careful in calculating 29 days for the month of February if the current year is a leap year, that is, if what remains of the division of the current year by four equals zero, to this result we add the number of days for the current date. Processing transactions by intervals of dates is then very fast.

The document number 405 is stored in a whole number to facilitate comparison tests when searching for transactions which are part of a document. A document comprises transactions having the same document number and the same date. Therefore, a debit amount can be credited to more than one account and vice versa. This is the multi-allocation. The amount stored as a floating point number 407 is always positive. Its accounting direction, debit or credit, is stored in the journal field 409 of the transaction structure. A value of 3 indicates that the allocation account is debited of the whole amount. A value of 4 indicates that the allocation account is credited by the amount.

The transaction data structure 401 is doubly linked with the pointers NEXT 402 and PREVIOUS 403 inside of the structure.

For each line in the transaction structure, a line in the display structure 410 is created to which the pointer is stored in the transaction structure 411. This pointer is also stored in an element of a distinct, doubly linked list of pointers 550 called a sub-list because the pointer of the first element is stored in the trial balance data structure 516 to link the transaction to its allocation account. If this pointer is not nil for the selected account, the detail of its balance can be displayed. The information which is found on each display line of the transactions 410 combines the data from the trial balance data structure 500 and the transaction structure 401. The account number 412 comes from the element of the trial balance data structure 500 pointed to by the pointer of the LINK vector 506 located at the LINKCHART element 408 of the transaction structure. The date 413, the document number 414, the description 415 and the amount 416, always positive, come from the transaction structure.

The pointer to the element 551, added with the insertion algorithm, to the sub-list 550 is stored in the display structure 417. The display structure also stores the pointer to the transaction structure to which it is linked 418. Keeping a transaction structure instead of just a display structure in the memory, allows not only to combine easily data from the trial balance data structure and the transaction structure for display purpose but also to permanently have access to data formats needed for a rapid process as, for example, the selection by dates or by document number, and the mathematical calculations. It also allows the user to edit the display according to the detail option as detailed herein, without needing additional space in the memory for temporary saves.

The present invention employs the use of 'doubly linked data structure' which defines how elements of a data structure are linked together to form a data structure. 'Doubly linked', in general, means that each data structure element is linked to the next element (first link) and to the previous element (second link) by storing the address of these next and previous elements. A further clarification is provided with respect to 'pointers', wherein pointers in the present invention are (or can be) memory addresses such as is returned by a memory allocation function.

In one embodiment, the present invention dynamically allocates a memory space on a one by one basis for each individual element of a data structure, and since the return value of a memory allocation function is a pointer (the memory address of an available memory space allocated) the data structures are "doubly linked" by using the insertion algorithm of Table 1 to store the 'NEXT' and 'PREVIOUS' data structure element pointers in the current data structure element, that is the memory address of the next element in the data structure and the memory address of the previous element in the data structure, which pointers (memory addresses) are function of available memory spaces at allocation time, so pointers are in random order rather than in a sequential order.

Dynamically allocating memory spaces refers to the process of allocating a memory space for each data structure element, on a one by one basis, as needed, in the memory of the computer. It also means reallocating the memory space of an element when this element is deleted (removed) from the data. The present invention according to one embodiment uses the electronic memory resources with no mechanical process, allowing for faster accounting data processing.

The memory according to one embodiment refers to providing the individual dynamic allocation of memory spaces, identifying a 'pointer' as a memory address and, defining 'doubly linked data structure' by how the data structure elements are linked together with pointer 'next' and 'previous' to form a data structure. Using these pointers, you can go through the data structure sequentially starting from the memory address of the first element of the data structure and move to the memory address of the next elements until the last element, or, being 'doubly linked', you can go through this data structure sequentially the other way, starting from the memory address of the last element of the data structure and move to the memory address of the previous elements until the first element of the data structure.

Referring to FIG. 5a, the organization of the accounting trial balance data in memory corresponds to a doubly linked data structure 500 which permits insertion, destruction and reordering of the accounts inside the list. As shown in FIG. 5a, a feature of this organizational data is that the linked list 501 is distinct and contains the pointers NEXT 502 and PREVIOUS 503 and a pointer to the trial balance data structure 504 which permits a greater flexibility for the manipulation, especially for the usage of the display module, for the maintenance of the financial statements and the management of the sub-lists of the financial statement items 505 of FIG. 5b.

When looking at the organization of the data of the chart of accounts, two items are noteworthy: the vector LINK 506 and the field LINKTRANS 507 of the trial balance data structure, corresponding to the sequence number of the creation of the account and which links the transactions to the accounts of the chart. It is also used to save the data of the financial reports in the files. Each time an account is created, a new element in the trial balance data structure 508 is created. A new element in the list of pointers 509 is also created and inserted in the list. The insertion algorithm used enables the insertion in an empty list, the insertion as the first item of a list, the insertion at the end of a list, and the insertion in the list. The insertion is done before the current pointer and the algorithm uses a previous pointer (the current pointer) for its operation.

TABLE 1

```
if (cour = = NULL)
        pred = last ;
else    pred = cour ->prev ;
new ->prev = pred ;
new ->next = cour ;
f (cour = = first)
        first = new ;
else pred->next = new ;
if (cour ! =NULL)
        cour->prev = new ;
else last = new ;
cour = new ;
```

In order to insert at the end of the list, one needs to initialize the current pointer to nil. To modify this list with a data entry screen 305, a temporary element is added at the end of the list before its display on the screen in order to permit the insertion at the end of the list.

A new LINK vector is created with one more element than the vector it replaces. The content of the old vector is copied in the new vector and the pointer to the new element in the trial balance data structure 510 is inserted in the new element of the LINK vector 511. The index of this element of vector 512 is inserted in the field LINKTRANS 513 of the trial balance data structure. The memory size of the vector is attributed dynamically, as for the trial balance data structure. The number of accounts that can be processed is only limited by the capacity of the memory of the computer used.

Referring to Table 2, when an account is deleted, the element in the list of pointers containing the pointer to the trial balance data structure 509 is taken out of the list of pointers by modifying the pointer NEXT 502 of the preceding element and the pointer PREVIOUS 503 of the NEXT element. The destruction algorithm used to remove an element from the doubly linked list is able to process cases in which the list is empty, the element to be destroyed is the first of the list, the element to be destroyed is the last one of the list and the element is in the list.

TABLE 2

```
if (cour ! =NULL)
{
    if cour->prev = = NULL)
        first = cour ->next ;
    else cour->prev->next = cour->next ;
    if (cour->next ! = NULL)
        cour->next->prev = cour->prev ;
    else last = cour->prev;
}
```

The memory for the element of the list 509 and that of the trial balance data structure 508 is reallocated. The element of the LINK vector 511 is initialized to nil but is not reallocated. The number of elements of the LINK vector 514 is cumulative. Only an inactive account can be deleted. An inactive account is an account for which the balance in the trial balance is zero, is a non-grouped account in a financial statement (FLAG_F/S 515 is nil), and is an account to which no transaction is linked (516 is nil).

When an account is moved within the list, only the NEXT 502 pointer and the PREVIOUS 503 pointer of the elements concerned in the list of pointers are modified, using, in a successive fashion, the algorithm of destruction and the algorithm of insertion.

The account number has a descriptive use and can be modified at all times. The pointers for the first element 517 and the last element 518 of the list of pointers 501 as well as the pointer to the first element 519 of the LINK vector are stored in memory throughout the operation of the system.

Referring to FIG. 5b, the financial statement data structure organization corresponding to a doubly linked data structure 520 permits insertion and destruction of lines of the financial statement inside of the list. A feature of this organization is that the linked list 521 is distinct and contains the pointers NEXT 522 and PREVIOUS 523 and a pointer to the financial statement structure 524, which makes the manipulation flexible, especially for the usage of the display module and the management of the sub-lists total 525. A notable field in the structure of the financial statement is the line type number 526.

Each time a line is created, a new element in the financial statement structure 527 is created. A new element in the list of pointers 528 is also created and inserted in the list, using the insertion algorithm.

When a line is destroyed, the element of the list of pointers containing the pointer to the financial statement structure 528 is taken out of the list of pointers with the destruction algorithm. The memory allowed for the element of the list 528 and that of the financial statement structure 527 are reallocated.

When the line destroyed is a line of the financial statement item type, the FLAG_F/S 515 of the trial balance data structure for which pointer 504 is in the sub-list financial statement item 505 must be reinitialized and the elements of sub-lists total 525 of financial statement lines of type total for which the contained pointer 529 corresponds to the financial statement item pointer 524 deleted is removed with the destruction algorithm.

The pointers of the first element 530 and of the last element 531 of the list of pointers 521 are stored in memory throughout the operation of the system.

The present system builds financial statement such as balance sheets 601, income statements, statement of retained earnings and cash flow statement, using any accounting trial balance data. The trial balance 600 of FIG. 6a shows a list of accounts with respective balance. There are several columns which represent the accounting data for evaluation in this example. The present invention provides for the identification of accounts, which can be either by an account number (0, 1, 5, 100, 200, 500, 505) or the corresponding account description (Cash, Bank-current, Credit card, Accounts receivable, Inventories, Fixed assets, Accrued depreciation), wherein these items have corresponding Debit or Credit amounts.

The present invention allows the user to establish the group of accounts 603, 604, 605 devoid of the rigid framework and restrictions of the typical accounting systems that employ a Chart of Accounts.

As detailed herein, the financial report of FIG. 6b represents a portion of a balance sheet. The trial balance of FIG. 6a includes "accounts" 603, 604, and 605, and the balance sheet of FIG. 6b includes those accounts grouped into a "financial statement item" 602. The financial statement item 602 is thus a group of accounts 603, 604 and 605—Debit amounts $254.27 and $2,853.74—and Credit amount $400.62—resulting in $2,707.39 Debit. The financial statement item 602 can then be grouped into one or more totals 606. Distinguishing between financial statement items 602 and totals 606 enables highly flexible manipulation of the accounting data. As a result, any type of financial statement can be produced, independently of the type of business, report, and accounting system that provided the accounting data.

Figure 7:
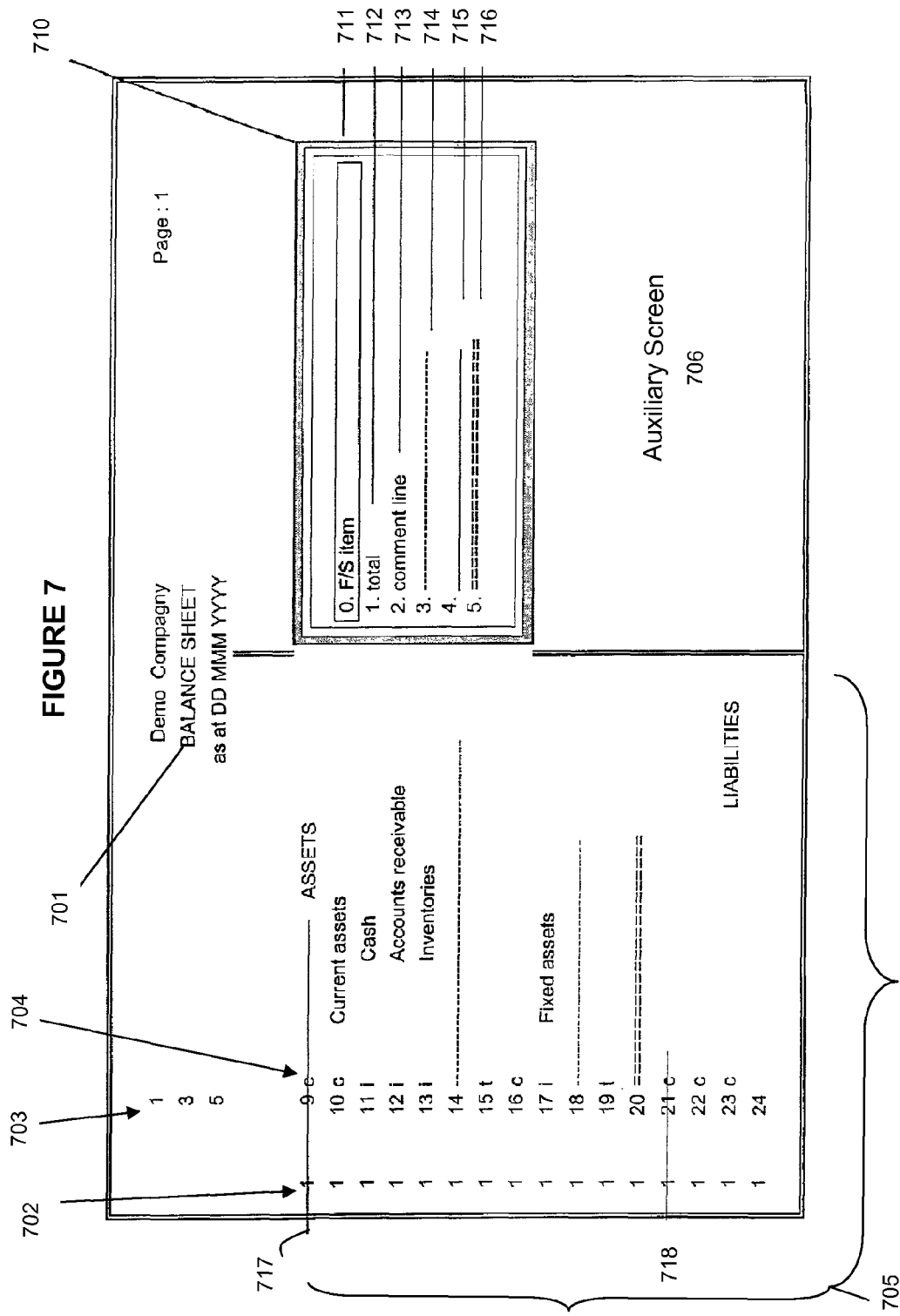
FIG. 7 is a screen display showing the different types of lines to be chosen from the attribute to a financial statement line according to one embodiment.

An example of the financial statement editor is shown in FIG. 7, which indicates certain identifying information such as the name of the financial statement 701 and, for each line of the financial statement, the number of the page 702, the number of the line 703, and the type of line 704. The financial statement editor provides a graphical user interface (GUI) for editing the financial statement items. Other typical fields include a company name and a corresponding date associated with the processing.

The balance sheet is shown wherein the user typically determines the type of each of the lines of the financial statement. When the user decides to insert a new line in the financial statement, an auxiliary screen 710 can be used to help the user select the type of this line: 3. (714), 4. (715) and 5. (716) are the three types of underlined symbols (dashed, continuous, double-dashed) of balances appearing in the financial statement. These underlined symbols are automatically aligned underneath the balances by the financial statement generator. The type 2. (713) is used to insert headers 717, blank lines 718, etc. The types 0. (711) and 1. (712) represent lines in the financial statement comprising balances. This distinction between these two types of balances appearing on the FIG. 6b financial statement item 602 and totals 606, represent one way they are processed, and represent one of the unique features of the invention.

Referring again to FIG. 6b, FIG. 7, and FIG. 8, an item in the financial statement 602 is a group of accounts 603, 604 and 605. The user can use the trial balance data structure and the display module to make these groups in a simple and rapid way through the user interface of the financial statement editor. After the user has selected the type 0. (711), the financial statement editor displays the accounts that are already grouped to this item 801 and displays the accounts that are not yet grouped to an item of the financial statement 802, since an account cannot be grouped twice in the same financial statement.

Figure 8:
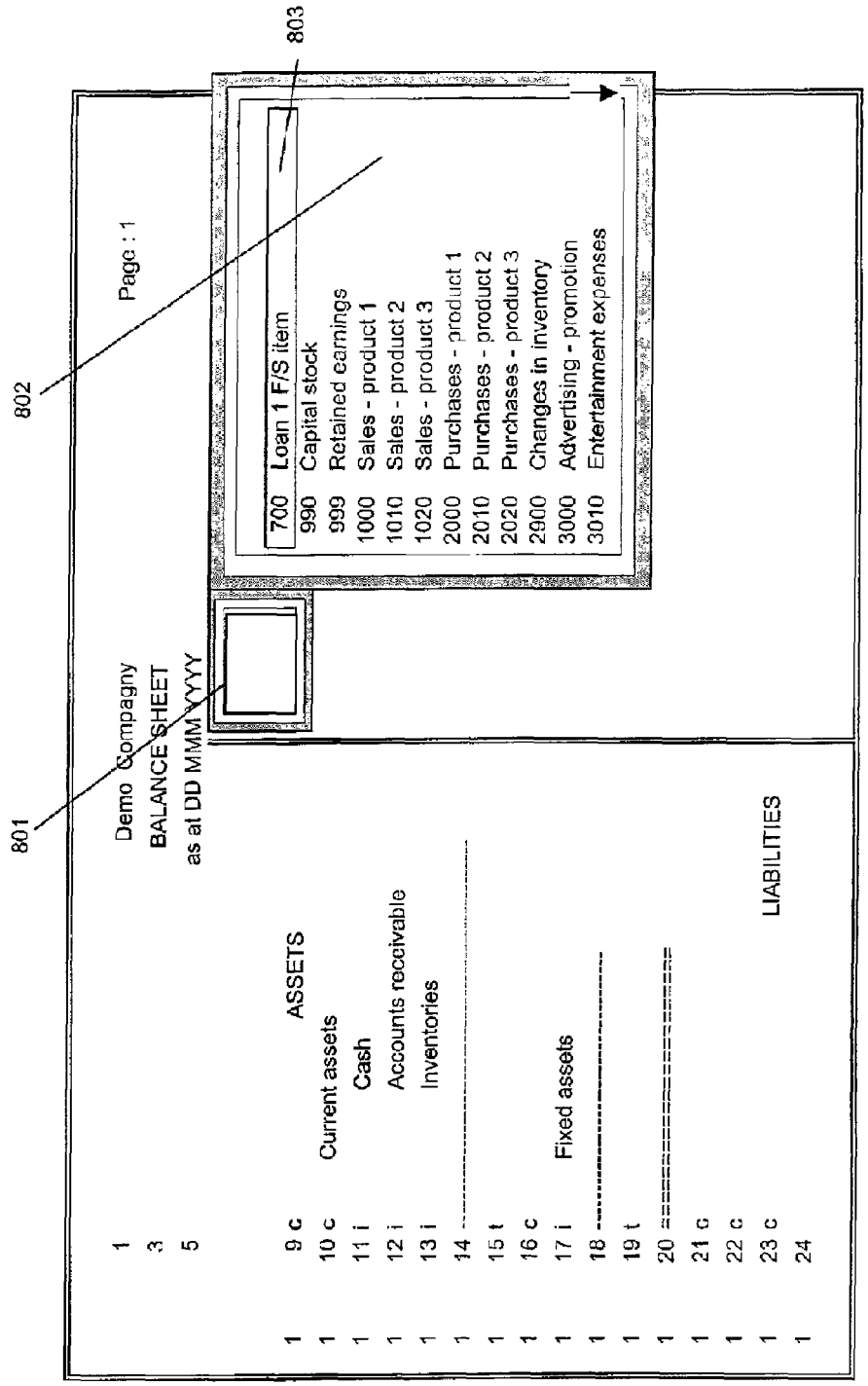
FIG. 8 is a screen display showing the list of accounts already grouped into financial statement items and the list of accounts which can be selected according to one embodiment.

The list of grouped accounts 801 displayed in FIG. 8 corresponds to a partial description as enabled by the display module, of the accounts of the trial balance data structure 532 from FIG. 5a to which the pointer is in the sub-list item 505 of the current line of the financial statement, to which sub-list a temporary element is added to the end before its display to permit the insertion at the end of the list as described earlier for the modification of the list with the data entry screen.

The list of non-grouped accounts 802 is built by reproducing the list of pointers of the trial balance data structure 501 in another list (CNG list) and by sweeping the sub-list of each of the financial statement items of the financial statement 505 to remove from the CNG list, the accounts already grouped to an item, since an account cannot be grouped twice for the same financial statement.

The user can insert a new account to the list of grouped accounts at the item 801 or can remove one. For inserting an account, the user selects, using the display module, an account from the list of non-grouped account 802. The latter one is removed from this CNG list, with the destruction algorithm, and is added to the list of grouped accounts at item 801, that is, inserted, with the insertion algorithm, to the sub-list item 505 which is a distinct doubly linked list containing the pointers NEXT 533 and PREVIOUS 534 and a pointer to the trial balance data structure 535. In the financial statement structure 520, the line type number 526 of the financial statement structure is initialized to zero.

To remove an account from the list of grouped accounts, the account is deleted from the sub-list item 505 with the destruction algorithm and is inserted in the CNG list.

The address of the first and the last element of the sub-list is stored in the financial statement structure in the fields FIRST account 536 and LAST account 537. When a line of financial statement item type is inserted, at least one account must be grouped to it.

Figure 9:
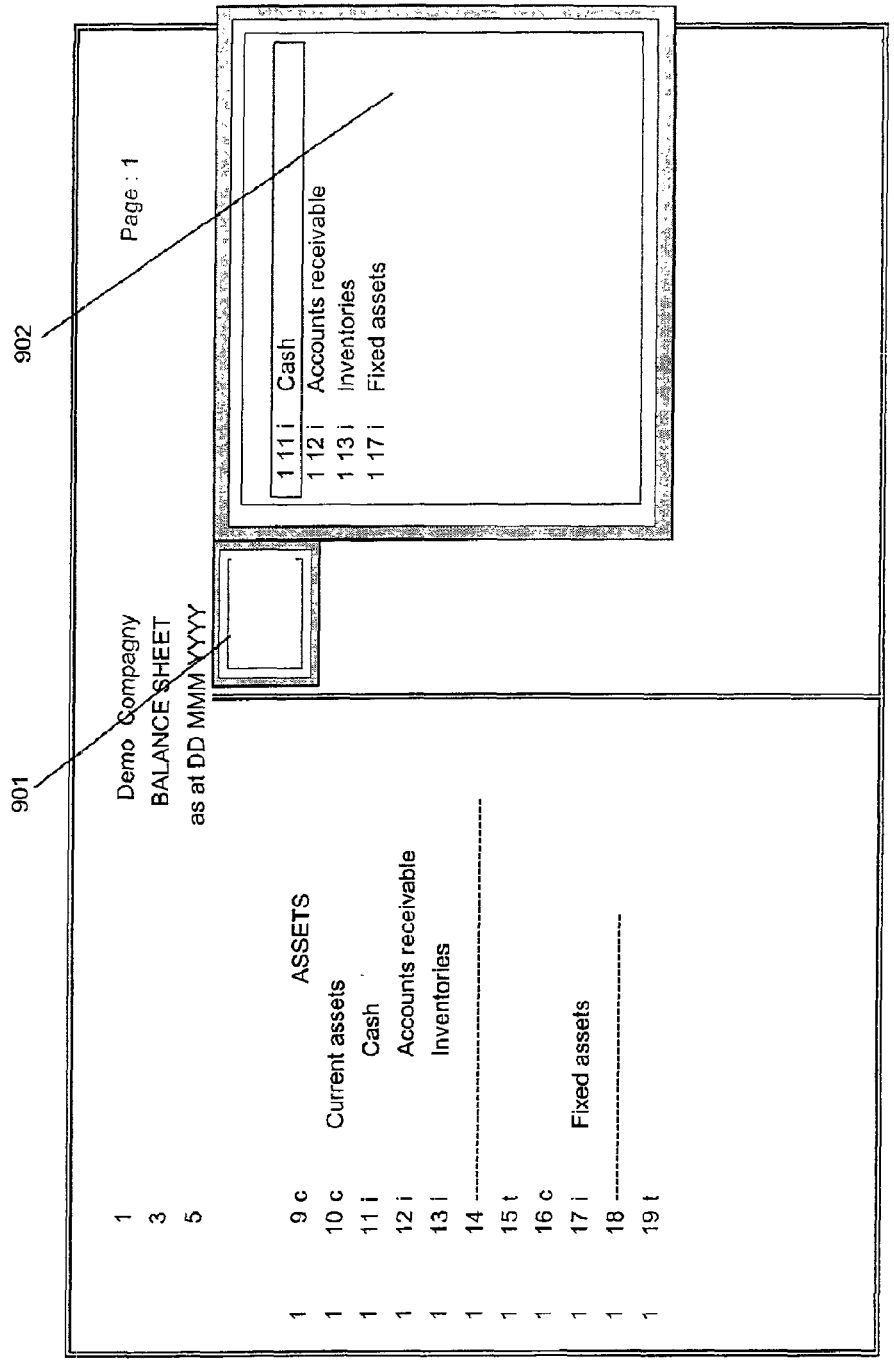
FIG. 9 is a screen display showing the list of financial statement items already grouped and the list of financial statement items that can be selected according to one embodiment.

Referring also to FIG. 9, a total on the financial statement is a total of balances of items. The financial statement editor enables a user, using the data structures of the financial statement and the display module, to group financial statement items in a simple and rapid way via the GUI. After the user has selected the type 1. (712), the financial statement editor displays the lines of financial statement items which are already grouped to this total 901 and displays the items which are not yet grouped 902 to this total. An item can be grouped to more than one line of type total.

The list of grouped items 901 displayed corresponds to a partial description of the items of the financial statement structure 520 to which the pointer 529 is in the sub-list total 525 of the current financial statement line, before its display, a temporary element is added at the end of the sub-list to permit the insertion at the end of the list, as described earlier for the modification of the list with the data entry screen.

The list of non-grouped items (PNG list) 902 is built by creating a list of financial statement structure pointers 521 inserting the lines of type item which precede the line of type total, and by removing from this list the items already selected and included in the sub-list total 525 of the current line of type total, since the balance of an item cannot appear twice for a same total.

The user can insert a new item to the list of grouped items to the total 901 or can remove one. To insert a new item, the user selects, through the display module, an item from the list of items to group 902. The latter one is removed from this PNG list, with the destruction algorithm, and is added to the list of grouped items to the total 901, that is, inserted using the insertion algorithm to the sub-list total 525 which is a doubly linked distinct list containing the pointers NEXT 538 and PREVIOUS 539 and the pointer to the financial statement structure 529 of the line of type item. In the financial statement structure 520, the line type number 526 of the financial statement structure is initialized to one.

To remove an item from the list of grouped items, the item is removed from the sub-list total 525 using the destruction algorithm and is inserted in the PNG list. The address of the first and the last element of the sub-list total are stored in the financial statement structure in the FIRST item 540 and the LAST item 541 fields.

The conventional classification of a trial balance comprises the financial statement item's assets, liabilities, profits, revenues and expenses. This classification facilitates the building of the groups in the conventional financial statement. With the financial statement editor, this classification is not important since the groups of accounts under the items of the financial statement are done account by account.

Figures 10A, 10B:
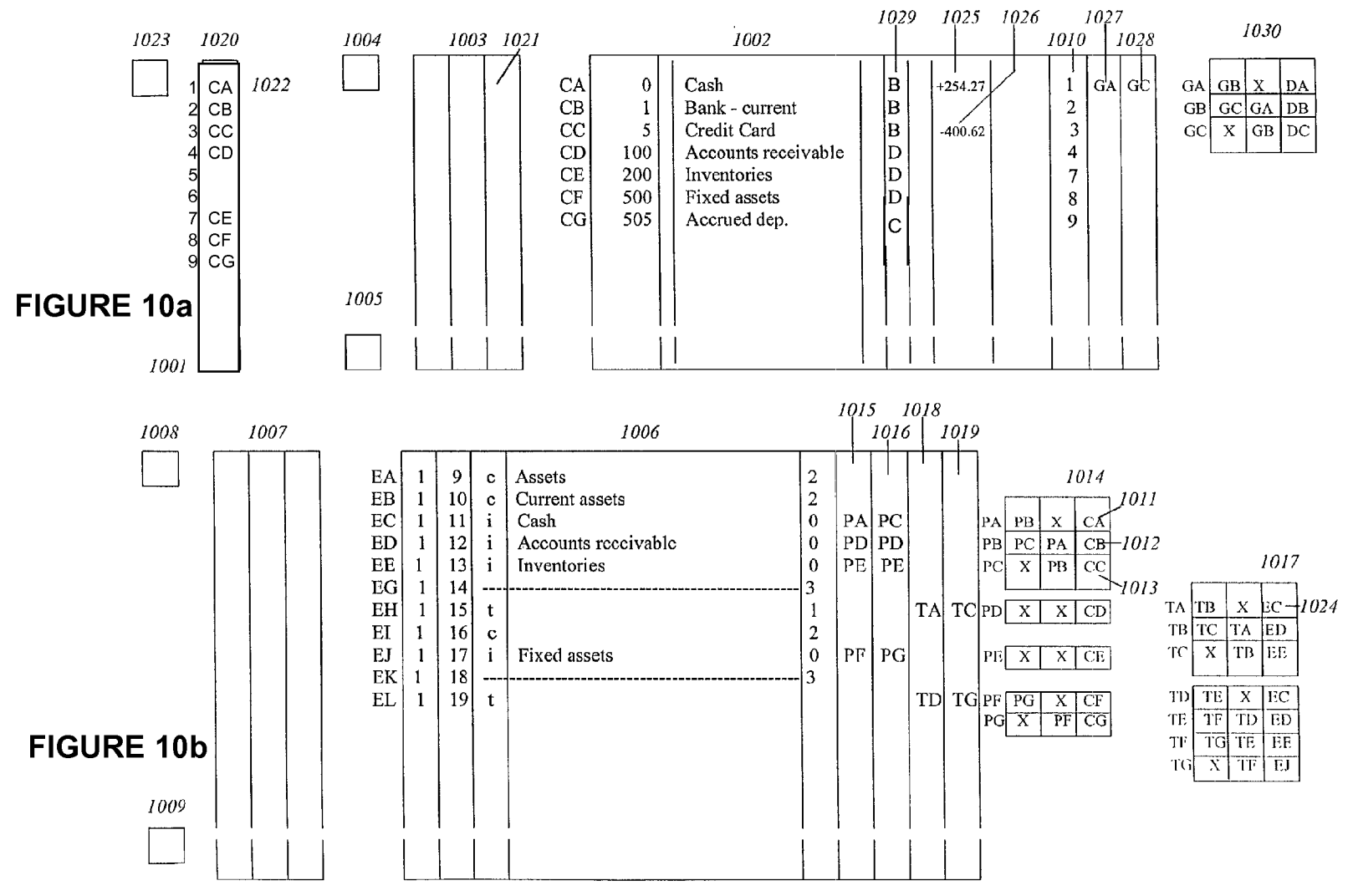

FIG. 10a and FIG. 10b shows an example of the contents for the memory resources. To keep the contents and reuse it after the computer is turned off or powered down, the system saves this data in an external memory unit which allows the data structures of FIG. 10a created with the financial statement module to be reconstituted and their contents to be reloaded in memory. The number of elements of vector LINK 1001 is saved 1101 in file MASTR.DAT of FIG. 11. The contents of the trial balance data structure 1002 is saved in a sequential fashion by sweeping the list of pointers of trial balance data structure 1003 from the first element 1004 to the last element 1005 as shown in FIG. 12. The contents of the financial statement structure 1006 is saved in a sequential fashion by sweeping the list of pointers of the financial statement structure 1007 from the first element 1008 to the last element 1009 as shown in FIG. 13. For the sub-lists items and the sub-lists totals, the LINKTRANS 1010 of the accounts are saved.

For a line of type item on the financial statement, the LINKTRANS 1010 of each account grouped at item 1301, 1302 and 1303 is saved, that is, the LINKTRANS corresponding to the pointers of the trial balance data structure 1011, 1012 and 1013 of the sub-list item of which the pointer to the first element is in the financial statement structure 1015, as for the pointer to the last element 1016. The LINKTRANS of the last element being saved, the maximum value of the round number is saved 1304.

For a line of type total on a financial statement, the LINKTRANS of the first account of each item grouped at total 1305, 1306 and 1307 is saved. This LINKTRANS corresponds to the pointers of the trial balance data structure (for example 1011) of the sub-lists items 1014 for which the pointer of the first element of the sub-list is in the financial statement structure 1015 and for which the pointer to the financial statement structure 1024 is contained in an element of the sub-list total 1017 for which the pointer of the first element is in the structure financial statement 1018, as for the pointer of the last element 1019. The LINKTRANS of the first account of the last element being saved, the maximum value of a round number is saved 1308.

The reloading of the data consists in reading the data of the system previously saved and to initialize the data structures of FIG. 5 in the memory.

The trial balance data structure 1002 and the doubly linked list of pointers to the trial balance data structure 1003 are built sequentially after reading the file CHART.DAT of FIG. 12. Each element of the list of pointers is added at the end of the list with the insertion algorithm. The pointers of the first element 1004 and the last element 1005 of the list of pointers 1003 are saved in memory throughout the operation of the financial statement module.

The vector LINK 1020 is created. The number of elements of the vector LINK is the number saved 1101 in MASTR.DAT. The elements of the vector are initialized by sweeping the trial balance data structure 1002 in a sequential fashion with the list of pointers 1003 and by attributing, for each account in the list, the pointer to the trial balance data structure 1021 to the element of the vector 1022 corresponding to the index LINKTRANS 1010 of the account. The pointer of the first element 1023 of the LINK vector is saved in memory throughout the operation of the financial statement module.

The financial statement structure 1006 and the doubly linked list of pointers of the financial statement structure 1007 are built sequentially to the reading of the financial statement file of FIG. 13. Each element of the list of pointers is added at the end of the list with the insertion algorithm. The pointers of the first element 1008 and of the last element 1009 of the list of pointers 1007 are saved in memory throughout the operation of the financial statement module.

For the creation of sub-lists of item 1014, comprising an element for each account of the item, an element is added at the end of the list, with the insertion algorithm, for each LINKTRANS 1301, 1302, 1303 read in the financial statement file until the maximum LINKTRANS 1304. The contents of this element 1011 is initialized to the value of the content of the element at the index LINKTRANS in the vector LINK 1022, which contains the pointers to the trial balance data structure.

For the creation of sub-lists total 1017, comprising an element for each item of the total, an element is added at the end of the list of this list of pointers, with the insertion algorithm, for each LINKTRANS 1305, 1306, 1307 read in the financial statement file until the maximum LINKTRANS 1308. The contents of this element 1024 is initialized to the value of the pointer of the financial statement structure 1006 for which the LINKTRANS 1010 of the first account 1015 of the sub-list item 1014 corresponds to the LINKTRANS read (for example, 1305). To find the pointer to the financial statement structure, the module sweeps the list of pointers 1007 from the first element 1008 until the current element.

The noteworthy elements of the financial statement module are the LINK vector, the LINKTRANS field of the trial balance data structure and the line type number field of the financial statement.

Referring again to FIG. 10, the sequential number before each element of the vector LINK 1020 and the initialization of vector elements according to LINKTRANS 1010 show the LINK vector and the LINKTRANS field. (Note that CA, CB, . . . are a hexadecimal representation of memory addresses (pointers)).

This concept is used to rebuild the sub-lists of pointers 1030, doubly linking transactions associated with a particular allocation account. The present invention uses the LINK vector and the LINK vector element sequential number stored in the LINKCHART field of the transaction data structure to access the sub-list addresses 1027-1028 of the associated allocation account thru its new pointer (memory address) stored in the LINK vector by the reload process.

As for the elements of the trial balance data structure that are 'doubly linked' for more than one purpose, knowing that doubly linking for more than one purpose could be useful for transactions, the present invention uses doubly linked lists of pointers, and displayline data structure element pointers, to 'doubly link' these transactions elements as needed, allowing the building of different lists of pointers for various type of transactions reports.

Also, knowing that sub-list is a list linked to an element of another list, the present invention uses sub-lists 1030 of displayline data structure element pointers to link lists of transactions associated with a particular allocation account, which simply requires that the memory address of the first element of this list 1030 be stored in the associated trial balance data structure element 1027, as for the last element 1028 the list 1030 being doubly linked.

By way of example, in one of the embodiments using RAM or flash memory, the unique accounting data organization might be void each time the computer is turned off. Thus, in this embodiment, the structure can be saved to disk memory before the computer is turned off or the volatile memory erased. But the pointers (memory addresses) returned by the memory allocation functions used for the dynamic allocation of individual memory spaces at available memory addresses typically can not be saved on external memory. To rebuild the distinct lists of trial balance data structure element pointers, the present invention use a vector (a sequential data structure) called the LINK vector that stores the memory addresses (pointers) of the individual allocated memory spaces for the trial balance data structure elements.

When the elements of the trial balance data structure are reloaded in the memory resources by the invention, using the memory allocation functions to allocate memory spaces on a one by one basis, for each trial balance data structure element at the then available memory spaces, the new pointers (memory addresses) returned by the memory allocation functions will be stored in the LINK vector and the doubly linked lists of pointers grouping the accounts into financial statement items will be rebuilt using theses new pointers stored in the vector according to the vector element sequential number stored in the trial balance data structure in the LINKTRANS filed which sequential number was saved in the trial balance file 1201 and in the financial statement file 1301, 1302, 1303.

The next step consists of generating the financial statement. Referring to FIG. 10a, FIG. 10b and FIG. 14, the financial statement generator initializes, for each element of the financial statement structure 1006, an element of the display structure 1401 for which the pointer 1405 is contained in an element of a distinct doubly linked list 1402 with the pointers NEXT 1403 and PREVIOUS 1404.

The contents of the lines of the display structure come from the combination of the data from the trial balance data structure 1002 (for the balances) and from the financial statement structure 1006.

In mathematics, totals are obtained, positive or negative, by adding or subtracting numbers. To increase a total, numbers are added, and to decrease a total, numbers are subtracted.

As is well known in accounting, the notions of addition and subtraction and of positive or negative totals are slightly changed. There are debit balances and credit balances which are increased or decreased by debiting or crediting amounts. Therefore, a debiting balance is increased by debiting an amount and is decreased by crediting an amount. A credit balance is increased by crediting an amount and decreased by debiting an amount.

Whether it is with a minus sign or with parenthesis, current systems simply teach identifying credit transaction amount and credit account balances with such sign, not if the direction is opposite to assigned accounting direction. Most current financial systems makes a direct correlation between the mathematic sign of the number and the accounting direction of the transaction amount: negative number=credit amount; and positive number=debit amount, so, the direction of each transaction is simply indicated by the mathematic sign of the number, and consequently the account balance with a minus sign to its right indicates a credit balance.

The double entry accounting principle implies that, for each accounting transaction, a balance is debited of the amount of the transaction and another balance is credited of the same amount. Therefore, the compilation of a trial balance, which lists all the accounts of the accounting system with their respective balance, at a given date, allows for the verification that the total of the debit balances equals the total of the credit balances and indicates if the accounting process for each transaction filed in the double entry accounting principle has been respected. For example, as it appears on FIG. 3c, total for Debits (22 234.24) equals total for Credits (22 234.24). As can be observed, total for Debits and Credits (22 234.24) of the Trial balance of FIG. 3a is different from total (58 879.57) of the transactions file, the Trial balance showing the computed account balances resulting from one or more transactions combining debits and credits decreasing/increasing accounts balance according to the accounting equation.

Figure 15:
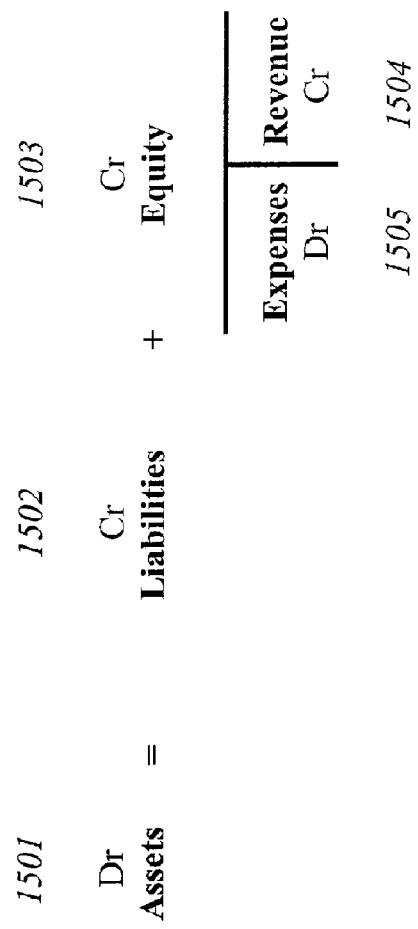
FIG. 15 illustrates an accounting equation.

The accounting equation of FIG. 15 is another illustration that the total amount of debits must equal the total amount of credits. The left portion of this equation has a debit direction and the right portion of the equation has a credit direction. That is, to increase the left side of the equation, therefore to increase the assets 1501, we have to debit an amount. To increase the right side of the equation, therefore to increase the liabilities 1502 or the equity 1503, we have to credit an amount. The profit or the losses of a business result form the difference between the revenues and expenses and increases or decreases the equity. Therefore, the revenues credit the equity 1504 and the expenses debit the equity 1505. To debit and credit these balances with mathematical functions in a computer which add and subtract numbers, the system treats the information in the following way. Using the balances of the trial balance, the module stores in memory a positive number for a debit balance of an account 1025 and a negative number for a credit balance 1026. These positive and negative numbers are accumulated, that is, added, never subtracted, in order to obtain the balances of the items and the totals for the financial statement. If the total of the amounts is positive, the balance is a debit balance. If the total of the amounts is negative, the balance is a credit balance.

When a financial statement is built, positive numbers and negative numbers are not shown, however balances are shown. According to the accounting equation, the balances on the left of the equation are debit balances and the balances on the right of the equation are credit balances. For each account, a direction is attributed 1029. The tag D is for debit and the tag C is for credit. For each item, the module uses the direction of the first account of the item to determine the direction of the item. Each total resulting of the addition of the balances of each of the accounts pointed to in the sub-list of the item 1014, is multiplied by 1 or by −1 according to the direction (D or C) of the first account of the item. A negative result for this multiplication is shown in parentheses for display purposes of the balance on the financial statement.

A balance is shown in parentheses only if it is of opposite direction to the direction of the item and not if it is a credit balance or not if it is of opposite direction to the direction of a section of the financial statement or of the whole financial statement in which it is shown. Therefore, a debit balance is shown in parentheses if the direction of the item is a credit, and a credit balance is only shown in parentheses when the direction of its item is a debit.

The same principle applies for the presentation of the balances of the totals. The module uses the direction of the first account of the first item of the total to determine the direction of the total. The total of a balance for a line of type total comes from the addition of the balances of each of the accounts pointed to by the sub-list item of each of the items pointed to by the sub-list total of the total. Each total is multiplied by 1 or by −1 according to the direction (D or C) of the first account of the first item. A negative result for this multiplication is shown in parentheses for display purposes. Once the information is transferred into the display structure 1401, a last line comprising a page jump 1406 is added to the list. The module stores the pointer to the first element 1407 and the pointer to the last element 1408 in this list 1402.

As taught by the present invention, the direction field maintained in the trial balance data structure of the system has several purposes. Another one is to enable a user to identify a transaction amount's effect on the corresponding account balance while consulting the account balance detail such as shown by the second level of detail of FIG. 20. In FIG. 20 of the present application, in addition to indicating the direction D for debit or C for credit for the transaction 2003 in the presentation, the financial statement module displays a "+" 2004 or a "−" according to the direction of the account 1029 to facilitate the comprehension of the effect of the transaction on the balance of the account. The direction of the account shown 2005 is attributed during the building of the trial balance data structure from the accounting data and can be modified by the user in the data entry screen of the trial balance. As explained herein, with the accounting equation of FIG. 15, a transaction debiting an account for which the direction is debit displays a "+". As well, a transaction crediting an account for which the direction is credit displays a "+". A "−" is displayed when the direction of the transaction is different from the direction of the account, for example, in the case of a transaction crediting an account for which the direction is debit or a transaction debiting an account for which the direction is credit.

Figure 16:
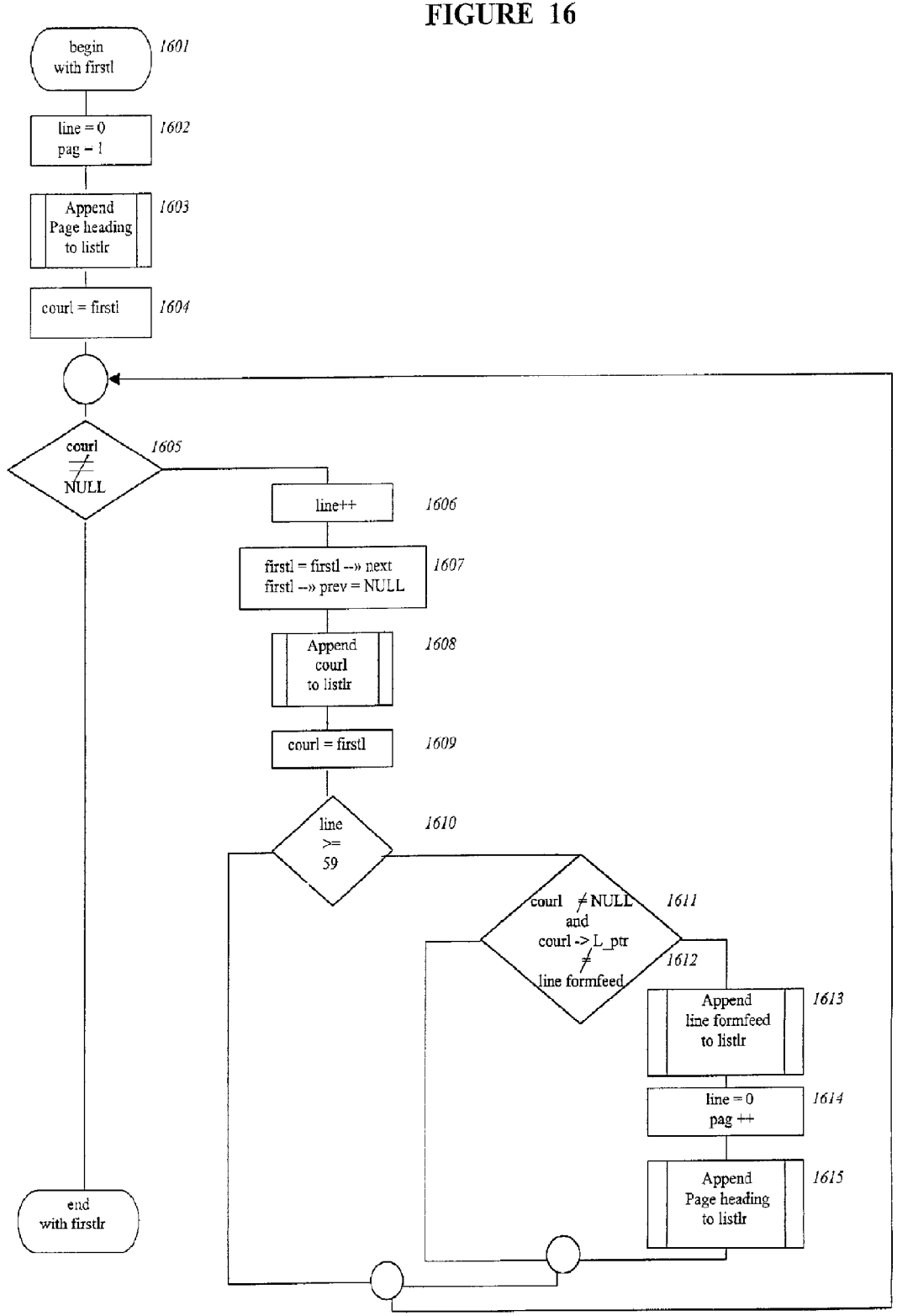
FIG. 16 is a flow chart of the skeleton of the report generator according to one embodiment.
Figure 17:
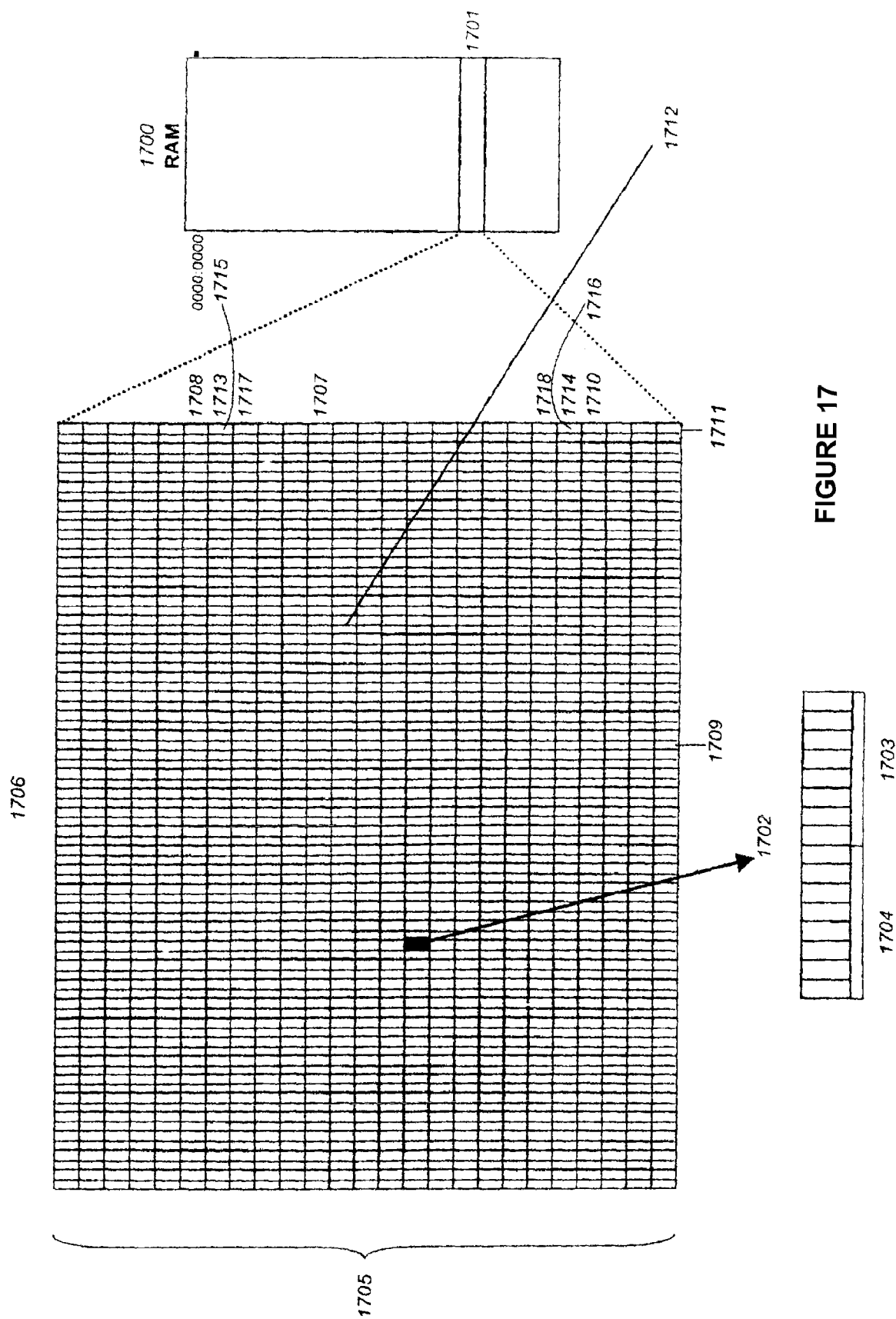
FIG. 17 shows the structure of the video RAM in central memory according to one embodiment.

The list then goes through the skeleton of the report to build the report to display or print. FIG. 16 illustrates the algorithm for processing the steps of adding the headers for the pages and the page jumps inside of the display structure list. In order to do so, the system creates another list of pointers 1409. At step 1601, the system receives the pointer of the first element 1407 from the list 1402 of the display structure 1401. It initializes a line counter to zero and a page counter to one at step 1602. It begins the list of pointers 1409 by adding, with the insertion algorithm, the header lines 1410 at step 1603. Then, it sweeps the list 1402 from the first element 1407 until the last element 1408 at steps 1604 and 1605. For each element, the line counter is incremented by one at step 1606. The element is removed from the list 1402 at step 1607 by initializing the pointer to the FIRST element 1407 of the list 1402 to the NEXT element and by setting to nil the pointer to the new first element pointing to the preceding element. The element is added to the list 1409 at step 1608. The pointer to the current element 1411 of the list 1402 is then incremented to the NEXT element at step 1609 before beginning the following test:

If the line counter is greater than or equal to 59, at step 1610, then if the pointer to the current element is not nil 1611 and if the current display line is not a page jump 1612 then the processing of a new page is begun.

The processing of a new page adds a page jump line 1613 to the list 1409, reinitializes the counter of lines to zero 1614, increments the page counter by one 1614, adds the header lines for the page 1615 to the list 1401. It is important that the last element of the list 1402 be a page jump line 1406 before going through the skeleton of the report, because if it is not, the list 1409 will not have a page jump on the last page of the report. The test 1611 ensures that the processing of a new page is not done after the end of the report. The test 1612 ensures that the processing of a new page is not done at the end of the report. The report, of which an example is shown in FIG. 18, is then ready to be displayed and printed.

The display of an example of this report is shown in FIG. 18. The display of all the auxiliary screens and the manipulation done on this display, including the selection of lines for the auxiliary screens for example, is done by the display module. This module can display any data structure which is doubly linked in a distinct list containing the pointers NEXT and PREVIOUS and a pointer for the structure, for example, the display structure 1401, the trial balance data structure 1002 and the financial statement structure 1006.

The module can do partial display of a line of the structure, that is, the number of characters to be displayed can vary and, the first character displayed can be different from the first character of the line of the structure. Therefore, the module can directly get its input form the trial balance data structure 1002 to display the FIG. 8 auxiliary screens 801 and 802 and directly take from the financial statement structure 1006 to display the FIG. 9 auxiliary screens 901 and 902.

In this example, to display the information, the module directly transfers the characters, one by one, in the video RAM in text mode 1701. The video RAM contains 4000 bytes. Since each character displayed on the screen necessitates 2 bytes 1702, that is 1 byte for the ASCII code of the character 1703 and 1 byte for the character attribute 1704, the video memory can contain 2000 characters. These 2000 characters are represented on 25 lines 1705 and 80 columns 1706 as for any screen of a computer. Using the segment address of the video RAM, the display module modifies the content of the 4000 bytes of the video RAM to execute its process of display and manipulation of display.

The module receives, as parameters, the pointer to the first element 1412 and the pointer to the last element of the list of pointers 1413 of the structure to display, the pointer to the first element displayed 1414 from the list, the pointer to the current element 1411 which, in selection mode, contains the line pointer of the selected display structure and for which the byte attribute of each of the characters for the corresponding line in the video memory is in inverse video mode 803, the current line number 1707 which corresponds to the line number of the video memory, of the screen, where is displayed the line of the structure pointed by the current element pointer 1411, the number of the line of the frame top of the display window 1708, the number of the far left column of the frame of the display window 1709, the number of the line of the frame bottom of the display window 1710, the number of characters of the line to transfer to the display window, the number of the first character 1415 from which each line of the structure will be copied in each line of the display window. The module calculates the number of the far right column of the frame of the display window 1711 by adding the number of characters of a line to transfer in the display window to the number of the far left column of the frame of the display window 1709 plus 1.

The display space 1712 used by the display module is inside this frame, that is, one line below the upper line of the frame of the display window 1708, one column to the right of the far left column of the frame of the display window 1709, one line above the bottom line of the frame of the display window 1710 and one column to the left of the far right column of the frame of the display window 1711. The module initializes the first line number of the display space 1713 by adding 1 to the number of the upper line of the frame of the display window 1708. To initialize the last line number of the display space 1714 the module calculates the number of lines of the display structure 1401, then compares it to the number of lines of the display space and adds the smaller number to the number of the first line of the display space 1713. Simultaneously, a pointer to the first element displayed when the last element of the list is displayed 1416 is initialized by climbing up the display structure list of the number of lines of the display space without going further than the number of lines of the display structure 1401.

The display module then fills in the display space of the video memory 1712, character by character, by copying the contents of the display structure 1401 from the number of the first character 1415 of the line of the structure pointed by the pointer to the first element displayed from the list 1414. In the rare cases where the number of lines in the display structure 1401 is smaller than the number of lines in the display space 1712, the module completes the contents of the display space in the video memory with nil characters 902. The character attribute of the line of the display space indicated by the current line number 1707 is put in inverse video mode, meaning that within the byte of the character attribute, the color for the font is used as the color for the background and vice versa. The display module allows the user to select these colors with the color selection module. This is done using a rainbow of colors for the font and another for the background, or by using a matrix of all possible combinations.

The number of lines of the display space 1712 being smaller than the number of lines to display 1401, the module indicates to the user if lines precede the first line displayed by showing an arrow pointing towards the top on the right upper corner of the frame of the display window 1715 if the pointer to the first element displayed from the list 1414 is different than the pointer of the first element of the list 1412 and by showing an arrow pointing towards the bottom at the bottom right corner of the frame of the display window 1716 if the pointer of the first element displayed from the list 1414 is different than the pointer to the first element displayed when the last element of the list is displayed 1416. If the pointer to the first element displayed from the list 1414 equals the pointer to the first element of the list 1412 or equals the pointer to the first element displayed when the last element of the list is displayed 1416, then the corresponding indicator is removed by copying the character of the frame located on the same line on the left column 1709, which implies that the same step is done for any character used for the frame. The display module uses this type of process inside the video memory to have grater compatibility with other systems and for the increased processing speed.

Then, the module waits for the user to press a key on the keyboard. As long as the user uses display keys, the display module is in function. Depending of the key chosen, the display is modified.

The current line number 1707 can be modified inside the limits of the first line number of the display space 1713 and the last line number of the display space 1714. Before each modification to the current line number 1707, the attribute of each of the characters in the video line indicated by the current line number are put back in normal video mode and, after each modification to the current line number 1707, the attribute of each of the characters of the video line which are indicated by the current line number are put in inverse video mode. This operation is done by the same function in both cases, this function uses the bit-wise operators left shift, right shift, and inclusive OR to modify the value of the byte attribute. Before doing this operation, to prevent the repetition of this process in the case that the key is pushed continuously and to prevent a blinking of the screen which is unpleasant to the user, the module verifies that the current line number 1707 is different than the first line number of the display space 1713 or than the last line number of the display space 1714, depending on the case. The pointer to the current element 1411 is maintained to the line of the display structure corresponding to the line of the video screen for which the character attribute is in inverse video mode and which corresponds to the current line number 1707.

The content of the display space can be modified, moving the content of the lines from right to left or from left to right by changing the number of the first character 1415, or moving the lines up and down.

When the modification of the display necessitates only the modification of one line of the video memory, the content of the video memory is modified by moving, one by one, inside the display space of the window, either the characters of the line which precedes starting with the last line number in the display space 1714 until the first line number of the display space plus 1 1717 or the characters of the line that follows starting with the first line number in display space 1713 until the last line number of the display space minus 1 1718. The processing being done inside the RAM video memory increases the speed of processing. The pointer to the first element displayed from the list 1414 is initialized, either to the pointer of the PREVIOUS element 1404, or to the pointer of the NEXT element. Only the characters of either the first line number of the RAM or of the last line number are transferred from the display structure, that is, those of the line of the current element 1411. In "scroll lock mode" the characters transferred from the display structure are either those of the line of the pointer of the first element displayed from the list 1414 or those of the line corresponding to the pointer of the first element displayed from the list 1414 plus the number of lines of the display space 1712 minus 1.

When the modification of the display requires the modification of the whole video memory, the display module modifies the pointer to the first element displayed from the list 1414 and fills in the display space of the video memory 1712, character by character, by introducing the content of the display structure 1401 from the number of the first character 1415 of the line pointed to by the pointer of the first element displayed form the list 1414. The pointer of the first element displayed from the list 1414 can be initialized directly to the pointer of the first element 1412, to the pointer of the first element displayed when the last element of the list is displayed 1416, or incremented to the pointer of the NEXT element or decremented to the pointer of the PREVIOUS element according to the number of lines of the display space 1712 minus 1, in order to leave a trace for the user. Before doing this modification, the module verifies that the pointer of the first element displayed from the list 1414 is different from the pointer of the first element 1412 and of the pointer of the first element displayed when the last element of the list is displayed 1416 to prevent useless repetition of this process if the key is pushed continuously. Any modification of the pointer of the first element displayed from the list 1414 must be done inside the pointer of the first element of the list of pointers 1412 of the structure to display and the pointer of the first element displayed when the last element of the list is displayed 1416.

Leaving the display module, the values of the pointer of the first element displayed from the list 1414, of the pointer of the current element 1411, of the current line number 1707 and of the last key pushed are transferred. The display module can be controlled to provide a successive selection.

Printing of the reports 206 is done by the printing module. This module receives the pointer of the first element of the list of pointers 1412 and transfers to the printer, character by character, line by line. According to an illustrative example, the transfer occurs at 80 characters per line until the last character of the last line. The printing process can be stopped if the user presses on a key to interrupt this transfer. The character of the element of its conversion vector corresponds to the index of the ASCII code of the character in the display structure.

TABLE 3 for (j=0; j< 79; j ++)
    put c (VC [cour 1 ->L ptr->LINE [j] ].stdprn);

The conversion vector is initialized as follows:

TABLE 4

BYTE VC[256] ; /* Conversion Vector */
   /* init conversion Vector */
   for (j = 0 ; j <32 ; j + +)
      VC [j] = 32 ;
   for (j = 32 ; j<127 ; j + +)
      VC [j] = j ;
   for (j = 127 ; j <256 ; j + +)
      VC [j] = 32 ;
   VC [128] = 67 ;
   VC [129] = 117 ;
   VC [130] = 101 ;

TABLE 4-continued

```
VC [131] = 97 ;
VC [132] = 97 ;
VC [133] = 97 ;
VC [134] = 97 ;
VC [135] = 99 ;
VC [136] = 101 ;
VC [137] = 101 ;
VC [138] = 101 ;
VC [139] = 105 ;
VC [140] = 105 ;
VC [141] = 105 ;
VC [142] = 65 ;
VC [143] = 65 ;
VC [144] = 69 ;
VC [147] = 111 ;
VC [148] = 111 ;
VC [149] = 111 ;
VC [150] = 117 ;
VC [151] = 117 ;
VC [152] = 121 ;
VC [153] = 79 ;
VC [154] = 85 ;
VC [250] = '\f'; /* code used by Form Feed */
/* */
```

Therefore, only the converted characters for ASCII codes 32 to 126, which are standard to all printers, are transferred to the printer. No installation step is necessary before using the system but the conversion vector can be reinitialized by the user for specific printers.

While consulting the report of a financial statement of which an example is shown at FIG. 18, the user can select a line and obtain detailed information. Referring also to FIGS. 19*a* and 19*b*, the direct access is provided by the sub-lists of electronic addresses, that is the financial statement data structure elements sub-lists of trial balance data structure element pointers 1014 and the trial balance data structure elements sub-lists of displayline data structure element pointers 1030. The first level of detail is the detail of an item 1901 which is obtained by inserting, in the display structure 1401 and in the list of pointers 1409 an element 1417 for each element in the sub-list item 1014 of the item selected. The present invention can save the pointer of the trial balance data structure 1011 of each element in the display structure 1418 and displays the modified report 1900. The user can manipulate the display and print the document or select a balance to obtain the detail of this balance.

The detail of a balance is obtained by going through the sub-list of display structure pointers 1030 from the pointer to the display line of the first transaction 1027 until the pointer to the display line of the last transaction 1028 linked to the account of the trial balance data structure corresponding to the pointer of the trial balance data structure stored in the display structure 1418 of the line selected. For each element of the sub-list, a similar element is created and inserted in a distinct list of display structure pointers as in 1409 to assemble a report as shown in FIG. 20 containing the list of transactions comprised in the balance of the account. The display structure pointer for each element of the distinct list is initialized to the one contained by the element of the sub-list.

To obtain this detail, the system has built, in the memory, the transaction data structure 401 and linked the transaction to the accounts of the trial balance data structure 1002. The transaction structure 401 is doubly linked with the pointers NEXT 402 and PREVIOUS 403 inside of the structure, since a distinct list in the other structures is not necessary.

To link the transaction to the corresponding account of the trial balance data structure 1002, the system stores its LINK-TRANS 1010 in the field LINKCHART 408 of the transaction structure. The LINKCHART which corresponds to the LINKTRANS of the trial balance data structure, is the index of the LINK vector 1020 where is found the pointer of the trial balance data structure for the allocation account of this transaction.

In order to respect accounting principles, any trial balance should be regularized before being presented as a financial statement. In order to do so, the user uses the data entry screen, also available to modify the transactions stored in the memory, to create transactions, such as general journal entries for regularization purposes and/or presentation in the memory and the external memory. It happens every so often that new accounts need to be created for these entries. The user then uses data entry screen to add accounts to the trial balance.

Figure 24:
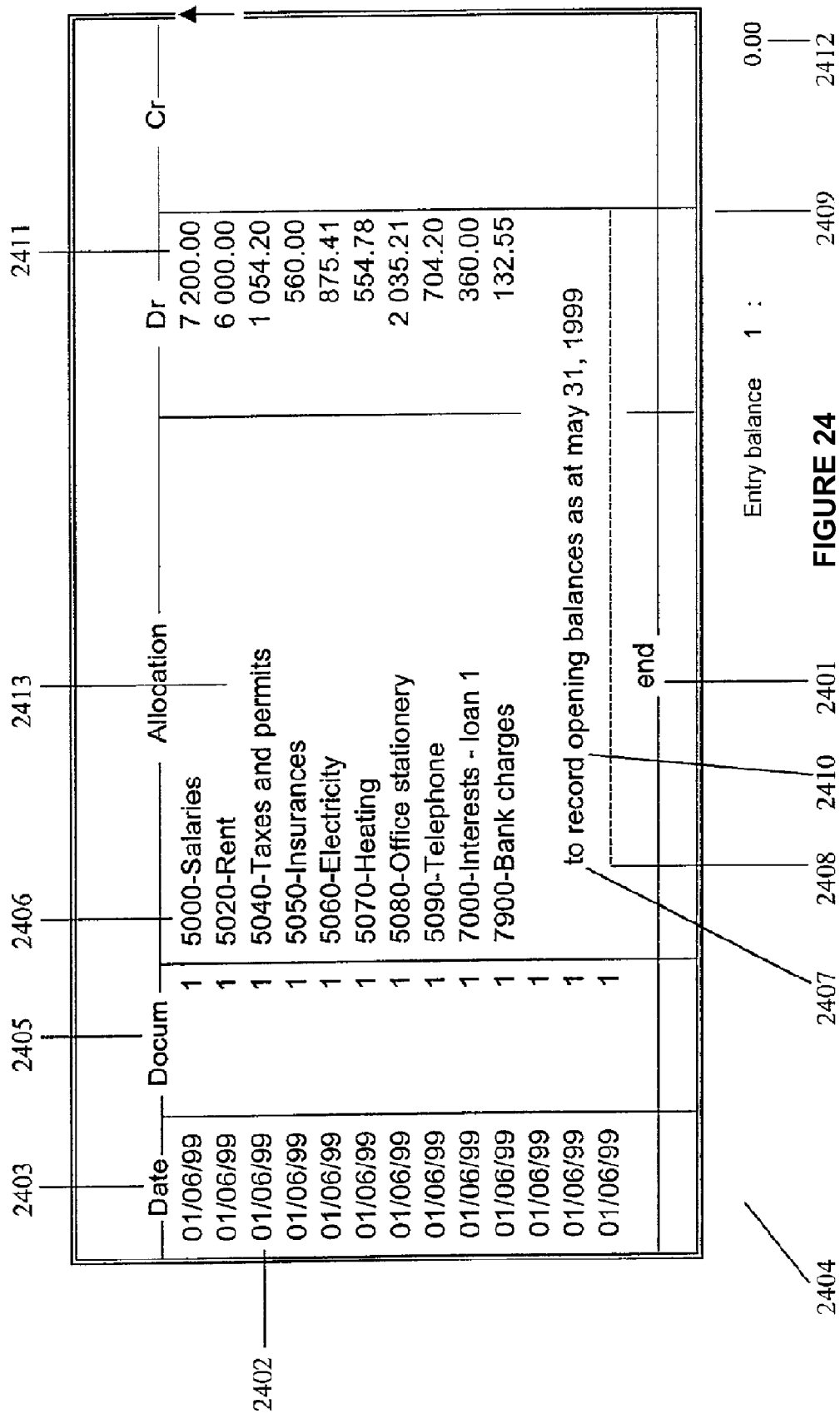
FIG. 24 is a screen display showing the input screen for the general journal according to one embodiment.

FIG. 24 shows the data entry screen for typing in general journal entries. The manipulation of the screen is done with the display module. The user positions the cursor on the line above which he wants to insert a new line. Note that a line called END 2401 is the temporary element added to the end of the list, before the display on the screen, in order to permit the insertion at the end of the list with the insertion algorithm as explained previously. The user can also destroy an existing line or modify its content by getting into the insertion mode. A default date is displayed in three sections DD/MM/YY 2402. The default date is the date of the preceding line. If it is the first line, the default date is today's date. Each portion of the date can be modified using the keys plus (+) or minus (−) or with numbers.

In one embodiment a calendar can be displayed on the screen display. In a working example, a calendar can be displayed by pressing the key "." which is the only key on the numerical keyboard which is not used in the date field. A date can be selected in the calendar and transferred in the date field. In order to save display space, the year portion of the date 2403 does not include the first two digits. The year portion can be modified only with the keys plus (+) or minus (−) to make sure, changing to a new millennium, that the first two digits not shown will correspond to this new millennium. The complete date "Monday, Jun. 1, 1999" is displayed in the message line 2404. The entry number 2405 of the preceding line is displayed by default and can be modified using the keys plus (+) or minus (−) or by inserting the number.

The next step consists of selecting the allocation account for the transaction 2406 or the comment option 2407. An element is added at the beginning of the list of the trial balance data structure 1002 with a "COMMENT" tag. The list of accounts is displayed with the display module as shown in the window 802 for the selection of the account. The number and the title (truncated before the last three characters but appearing in full in the message line 2404) of the selected account is entered in the allocation field 2413. The user can include comments 2407 simply by selecting, for the allocation account, the first line of the window of the chart, that is, the "COMMENT" line. The cursor is then positioned at 2408, the length of the field is limited by the line which separates columns Dr for debit and Cr for credit 2409. The user can insert a separation character, for example, a dash at position 2408 followed by enter and this character will be repeated automatically for the full length of the field 2410. A comment line is stored in a line of the transaction structure and a display line as with any other transaction which makes it easier to process some operations, such as the insertion of these lines on the detail of a balance report as shown in FIG. 20, in a very efficient way without needing any additional memory space.

A comment line is identified by the journal number 5 in the transaction structure 409, and the fields 419 and 408 are initialized to nil.

The insertion of the amount to debit or credit in the allocation account is simply done by typing in the amount in the right column. Only one amount per line is allowed.

In one embodiment, a calculator can be displayed on the screen display in order to allow the user to perform such calculations. In the working example, the calculator is accessible with the plus (+) key. The result of these calculations can be transferred in the field of the amount. A tax calculation module is also accessible with the key "*". The total of the debits minus the total of the credits for a document (same date and same number) must be zero 2412 in order to be able to quit the data entry screen. The insertion mode for the next lines is active as long as the user does not leave it.

Figure 23:
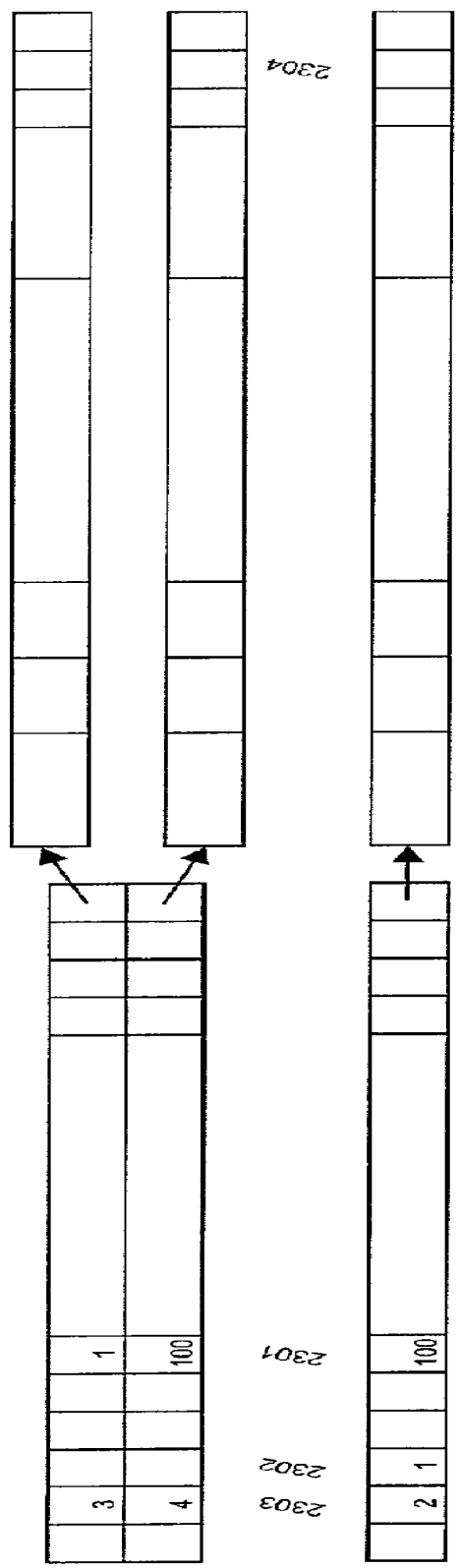
FIG. 23 illustrates the optimization of the accounting date according to one embodiment.

To maximize the use of this capacity, the system, because of the organization of the data in the memory, can optimize the loading in of the transactions by representing the debit line and the credit line of a transaction on only one transaction line and only one display line as shown in FIG. 23 and therefore doubles the number of transactions which can be loaded in the memory. For each amount, the LINKTRANS 1010 of the allocation account is saved in LINKCHART 2301 of the transaction structure. The double entry accounting principle requires a debit and a credit. In the data for each transaction, the date, the document number, the description, and the amount is the same for the debit and the credit part. Only the allocation account changes. And, for the majority of transactions recorded in an accounting system, except for the general journal entries, the transactions are linked to one or a few control account for one of the two portions, for example, a bank account, an account receivable, an account payable, etc. Therefore, for the majority of transactions, typically there are one or a few common denominators. By identifying these few control account by the direction "B" in the direction of the account 1029 in the trial balance data structure with the data entry screen, the financial statement module can link the debit and the credit of a transaction in the accounting data by the date and the document number, the description and the amount if necessary, and initializes the LINKBANK 2302 of the transaction structure which corresponds to the LINK-TRANS of the trial balance data structure, that is, the index of the LINK vector 1020 where the pointer of the trial balance data structure of the control account for the transaction is.

For example, when a debited account and a corresponding credited account are stored in a single element, the present invention uses the LINKBANK field to access the sub-list of the other associated account in the same way it uses the LINKCHART field, so the single element will be part of two doubly linked sub-lists 1030, and are linked to two accounts.

The pointer of the line of the display structure 410 stored in the transaction structure 411 is also stored, as for the allocation account, in an element of a distinct list of pointers which is doubly linked and called sub-list because the pointer of the first element and the pointer of the last element are stored in the trial balance data structure 1027, 1028 to link the transaction to the control account. The pointer of the element added with the insertion algorithm to the sub-list 1030 is saved in the display structure 2304.

The amount is always positive. Its accounting direction, debit or credit, is stored in a journal field 2303 of the transaction structure. A value of "1" indicates that the allocation account 2301 is debited of the amount and the control account 2302 is credited of the amount. A value of "2" indicates that the allocation account 2301 is credited of the amount and the control account 2302 is debited of the amount.

The detail of a balance is obtained by going through the sub-list of display structure pointers 1030 from the pointer to the display line of the first transaction 1027 until the pointer to the display line of the last transaction 1028 linked to the account of the trial balance data structure corresponding to the pointer of the trial balance data structure stored in the display structure 1418 of the line selected. For each element of the sub-list, a similar element is created and inserted in a distinct list of display structure pointers as in 1409 to assemble a report as shown in FIG. 20 containing the list of transactions comprised in the balance of the account. The display structure pointer for each element of the distinct list is initialized to the one contained by the element of the sub-list. Each element of the distinct list is added at the end of the list with the insertion algorithm. The processing of the information is fast and does not need much additional memory in order to create this report showing the detail of the balance. If the user chooses to display the transactions in a sorted manner, each element of the distinct list is inserted, with the insertion algorithm, according to the date of the transaction, the document number, or the amount, instead of being added at the end of the list, so no sorting of the transactions is necessary to provide this sorted presentation.

Referring to FIGS. 4, 10a, 10b, 20, and 23, for each display line containing an amount 2001, the amount 407 of the corresponding element of the transaction structure 418 is accumulated for the presentation of the balance 2002 at the end of the report. For this calculation, the sign of the amount is determined according to the journal 409 of the transaction as for the accounting direction. If the journal is 1 or 3, the sign is positive and the accounting direction is debit. If the journal is 2 or 4, the sign is negative and the direction is credit. However, in the case where the transaction structure has been optimized, if the display lines of the transactions are linked to the account selected 2008 in the report 1900 for a detail of the balance because the LINKTRANS 1010 of the selected account corresponds to the LINKBANK 2302 instead of corresponding to the LINKCHART 2301 of the transactions, then the sign and the accounting direction are inverted. For the presentation, in addition to indicating the direction D for debit or C for credit for the transaction 2003 in the presentation, the financial statement module displays a "+" 2004 or a "−" according to the direction of the account 1029 to facilitate the comprehension of the effect of the transaction on the balance of the account. The direction of the account shown 2005 is attributed during the building of the chart structure from the accounting data and can be modified by the user in the data entry screen of the trial balance. As explained earlier, with the accounting equation of FIG. 15, a transaction debiting an account for which the direction is debit displays a "+". As well, a transaction crediting an account for which the direction is credit displays a "+". A "−" is displayed when the direction of the transaction is different from the direction of the account, for example, in the case of a transaction crediting an account for which the direction is debit or a transaction debiting an account for which the direction is credit.

In one example, the system generates a financial statement such as shown in FIG. 19b starting the multiple levels of detail for the user generated financial statement. The accounts grouped 1902 into the financial statement item 'Cash' 1903 are depicted in this display. Also shown are the respective account balances 1901, the computed financial statement item balance 1904 (balance of the group of accounts) and a total balance of the group of financial statement items 1905. It should be readily apparent that the grouping of the accounts within the financial statement or within the financial statement items is regardless of an account sequence.

Furthermore, the user can easily drill down from the financial statement items to show the grouped accounts under that financial statement item. The user can also drill down from the financial statement balance to the balances of the grouped accounts. Furthermore, as is shown in FIG. 20, the user can obtain even further level of detail related to the debits and credits from the transactions data 2007 grouped to a particular account 2008 which make up the account balance 2002. As described herein, the '+' or '−' symbol 2004 at the end of the transaction line in the detailed report of the account balance. These symbols 2004 indicate whether the amounts increases or decreases the balance of the account according to the direction attributed to the account. For example, debiting a balance will increase '+' the balance of a debit account; debiting a balance will decrease '−' the balance of a credit account; crediting a balance will increase '+' the balance of a credit account; and crediting a balance will decrease '−' the balance of a debit account.

Thus, the system enables the provisioning of various detailed levels, starting with financial statement items detail (1st level), to a user selected account within a financial statement item ($2^{nd}$ level), to a user selected transaction line within that account (3rd level), the first level of detail including any accounts and respective account balances grouped into the financial statement item, the second level of detail including an account balance and transactions associated with the account balance, the third level of detail including at least one debited account and a corresponding credited account associated with the selected transaction.

Figure 22B:
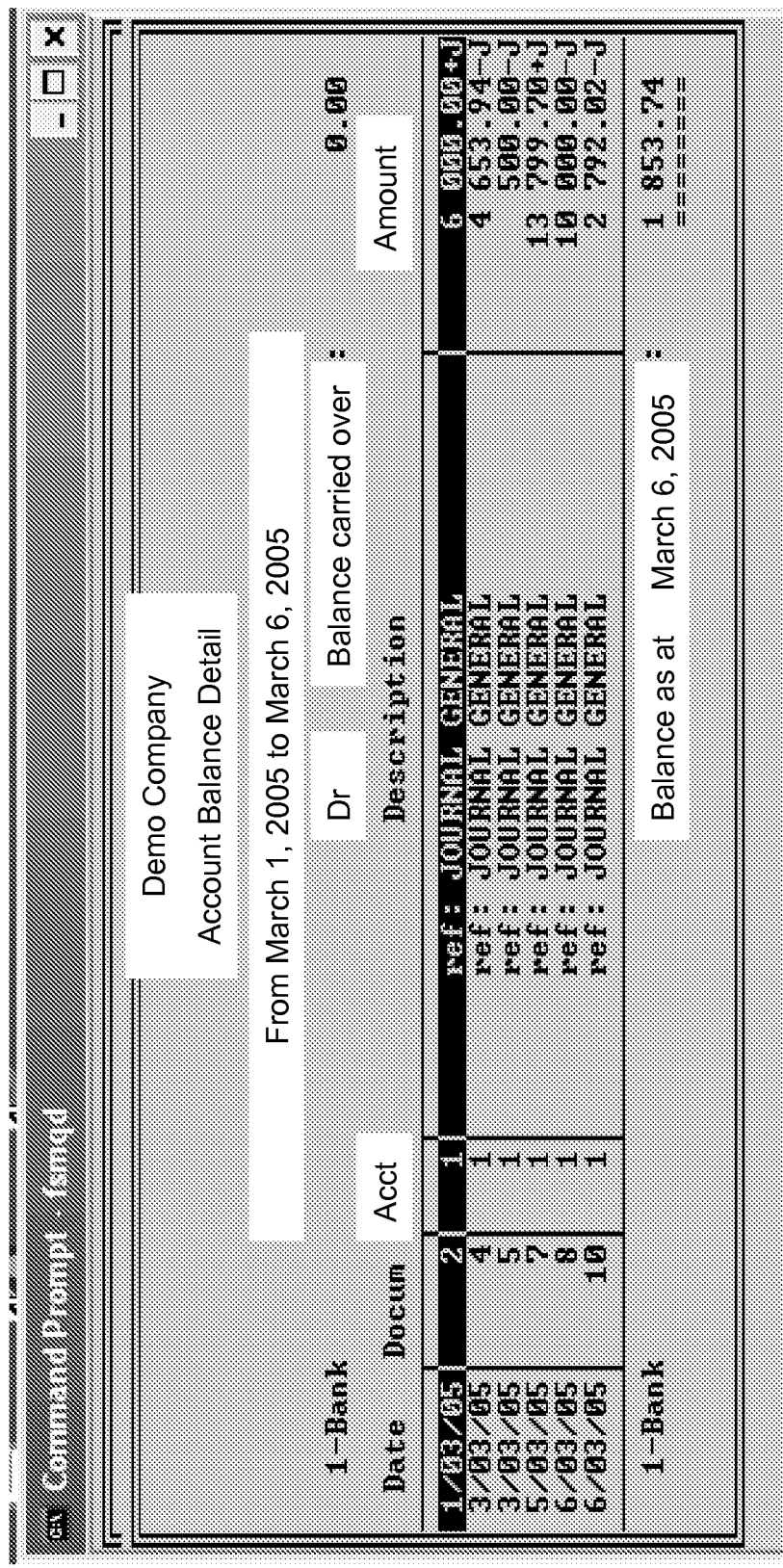

Another example of such provisioning of various detailed levels can be observed from a trial balance report FIG. 3c to a user selected account within the list of accounts FIG. 22b, to a user selected transaction line within that account FIG. 22a.

The present invention allows the user to navigate from the financial statement information displayed to the user and provides the ability to quickly locate additional information in the first, second and third levels of detail.

The balance carried over 2006 corresponds to the amount 1025 stored in the trial balance data structure and which comes from the data entry screen or from the balance carried over and calculated for the transactions, previous to the date of the report and saved in distinct files on an external memory unit when the number of transactions is greater than the capacity of the memory of the computer used. The user can load in these transactions in the memory to obtain the detail of a balance carried over. In order to provide this functionality, the number of elements of the vector LINK 506 is cumulative and the destruction of an account does not reallocate the element of the vector. The date of the report is stored in the file MASTR.DAT 1102 as well as the number of files 1103 which were created.

If the transaction is a general journal entry, its display line is modified to fit in the presentation of the detail of a balance. Therefore, the title of the allocation account 2413 is replaced by the mention "Reference: GENERAL JOURNAL" 2007 and the amount 2411, debit or credit, is moved to the end of the line. If the user so wishes, this display line can be replaced by the comment lines 2407 related to the journal entry. The module then finds the first line of the comment, different from a blank line, which follows this journal entry in the transaction structure and puts it in the display line instead of putting the mention "Reference: GENERAL JOURNAL", and then appends the other comment lines related to the journal entry.

In the case where the transaction structure has been optimized to have the credit and debit on a single transaction line and a single display line, the display line shows the account number of the allocation account. If the account for which the balance is detailed 2008 corresponds to the allocation account of the transaction, that is, if the LINKTRANS 1010 of the selected account corresponds to the LINKCHART 408 of the transaction, the account number 2009 is modified to indicate the counterpart, the control account, the one that its LINKTRANS 1010 corresponds to the LINKBANK 2302 of the transaction. If it is not optimized, the counterpart will be seen in the detail document.

Also, in the case where the transaction structure has been optimized, the system can group rapidly, without any sorting, the transactions by allocation account, if the detail of a balance is requested for a control account or by control account if the detail of the balance of an allocation account is requested and by journal entries and can calculate a total for each group. The system will sweep through the trial balance data structure 1002 from the first element to the last element without considering the account for which the detail is requested. For each account of the trial balance data structure 1002, it will verify if there are transactions in the detail of FIG. 20 by comparing the LINKCHART 2301, or the LINKBANK 2302 if grouped by control accounts, of each transaction line with the LINKTRANS 1010 of the current account of the trial balance data structure. If they are equal, then the element is retrieved from the list of pointers of the transaction display lines and is added in another distinct list of display line pointers, by inserting at the end of the list with the insertion algorithm. At the end, after sweeping the trial balance data structure, if the first list, the list of the account balance detail of FIG. 20, is not empty, either because the transactions left have an allocation account (LINKCHART) corresponding to the account for which the detail is requested, which have been skipped, or because, in the case where the account for which a detail is requested is an allocation account, the LINKBANK is nil, therefore not grouped, because none of the accounts in the chart have a nil LINKTRANS, the remaining transaction display lines are journal entries or comments if the user has chosen this option and are added at the end of the second list.

To finish the list of transactions, a last line composed of a page jump 1406 is added to the list. The module stores the pointer to the first element 1407 and the pointer to the last element 1408 of this list 1402. The list then goes through the skeleton of reports of FIG. 16 to build a report to display and print by adding headers and page jumps inside of the list of the display structure. The user can manipulate the display, print the document of FIG. 20, come back to the previous detail level, or select a transaction to obtain the details, that is, the detail document which lists the transactions as shown in FIG. 21.

Figure 21:
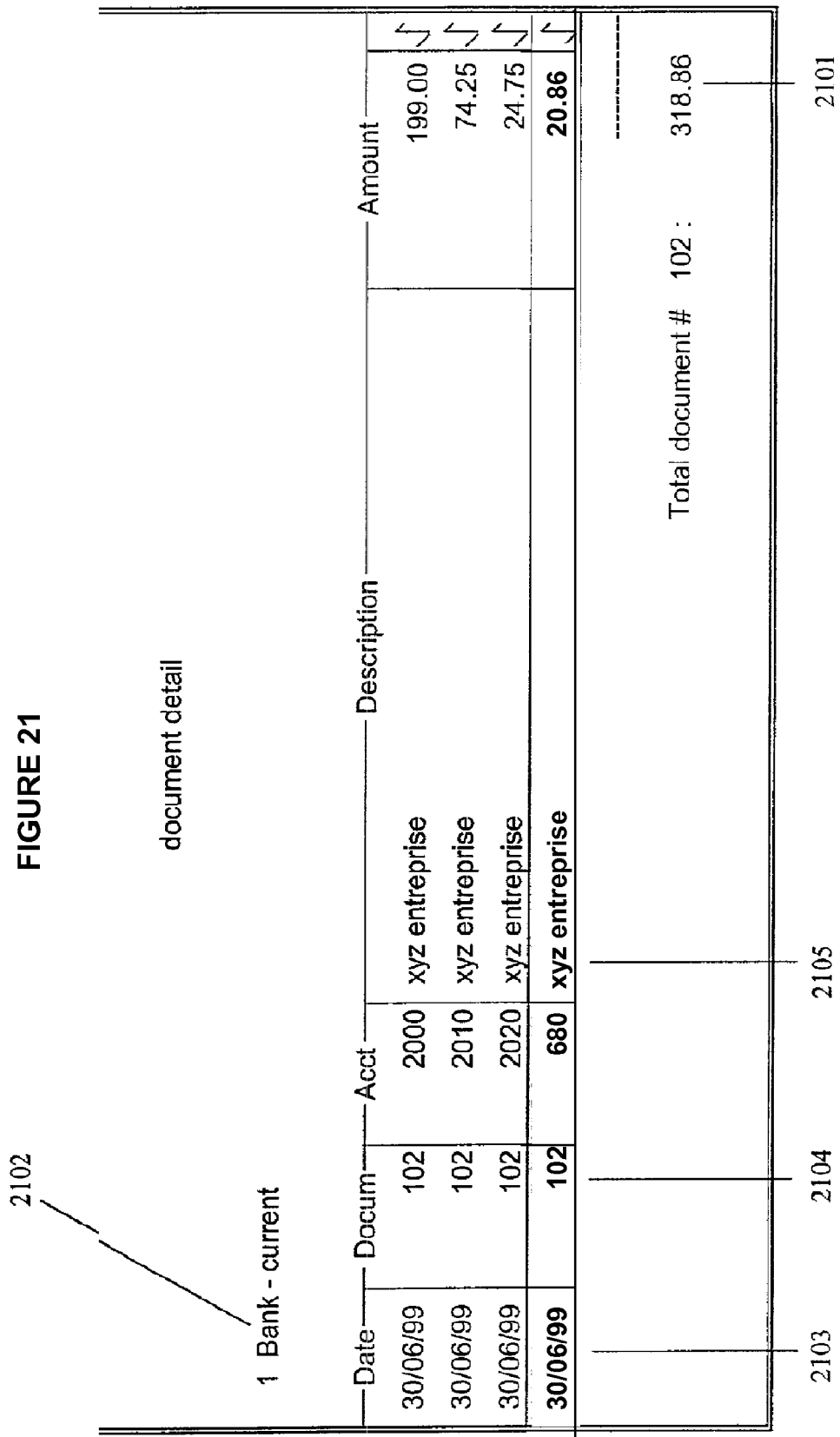
FIG. 21 is an example of the detail option at the document level according to one embodiment.

FIG. 21 shows the presentation of the detail of a document, wherein the transaction structure has been optimized. In a non-optimized embodiment, the presentation may be of the type of FIG. 22a, with the Debit and Credit columns. FIG. 22b showing the prior level detail report for FIG. 22a.

Referring again to FIG. 4 and FIG. 21, the module looks in the transaction structure 401, for the first transaction and the last transaction which build this document, that is, the transactions having the same date and the same document number, starting from the transaction pointer saved in the display line 418. The module then builds a distinct list of display pointers from the display line pointers saved in the transaction structure 411 and calculates a total for the document 2101. The report contains a line to display the control account 2102. The user can request a light presentation. In the light presentation, the date 2103 and the document number 2104 being identical for all transactions, will only appear on the first transaction line. To finish the list of transactions, as shown in FIG. 14, a last line composed of a page jump 1406 will be added to the list. The module will save the pointer to the first element 1407 and the pointer to the last element 1408 of the list 1402. The list will then go through the skeleton of reports of FIG. 16 to build a report to display and print by adding the header and the page jump inside of the list of the display structure. The user can manipulate the display, print the document such as in FIG. 21, or come back to the previous detail level such as FIG. 20.

In the case where the transaction structure has been optimized and the control accounts have been identified, the detail of a balance of an account as shown in FIG. 20 groups debits and credits. It is possible to obtain, for a control account, a report containing just the debits or a report containing just the credits, simply by going through the transaction structure in search of all transactions comprised in the date interval chosen, which have a journal 409 equal to "1" if the credits of the control account are required, or equal to "2" if the debits are required, and for which the LINKBANK 2302 corresponds to the LINKTRANS 1010 of the control account selected. A light presentation can be requested. In the light presentation, the date 2103 and the account number document 2104, being identical for all transactions of one document, and the description 2105, if it is also identical, will only appear on the first transaction display line of the document. A total for each document can be requested. In that case, the total is added between the description and the amount of the last display line of the document. No additional display line is necessary. The process only requires to modify the display lines already available which can be reinitialized after the processing, using the transaction structure. The system can also rapidly group, without doing sorting, the transactions by allocation accounts and calculate a total for each group, if the user desires, processing as explained earlier for the account balance detail report.

In the case where the transaction structure has been optimized and that control accounts have been identified, it is possible to obtain a report containing all the debits and the credits by having the system go through the transaction structure and look for all the transactions comprised in the date interval chosen which have a journal entry 409 equal to "1" and to "2" and for which the LINKBANK 419 corresponds to the LINKTRANS 2305 of the control account selected. This report can be used for verification purposes for example, by the reconciliation module of FIG. 25, which lets the user check each one of the transaction lines in the case where the user wants to compare with a document such as a bank statement. It should be noted that the reconciliation does not require optimization, however the control account is typically required. The calculation unit 2501 displays a theoretical account balance 2502 calculated from the balance 2503 of the control account 2504 at a chosen date 2509, in which balance the amounts of the transactions listed are included, plus the total of credits that have not been checked 2505 minus the total of debits that have not been checked 2506. So, instead of going by reconciliation, from the bank statement balance to a reconciliated or theoretical book balance for the account, the calculation unit uses the book balance of the account to calculate and display a theoretical bank statement balance throughout the process of checking the transactions. With this, the user does not have to wait for the printing of the reconciliation report to know if the balance of the account in the books has been reconciliated successfully with the balance of the bank statement, and to go back to the checking process if not, and so on. When this theoretical balance equals the bank statement balance, the user knows that he has succeeded in his verification task and can then print the reconciliation report. Since a document can contain many transaction lines, when the transactions are checked, the user has to ensure that the total of the lines checked of the document 2507 equals the total of the document 2508. Since the display module can be controlled to provide a successive selection, in the case of the reconciliation module, it is sufficient to maintain the key pushed for the lines to be checked in a successive manner.

As noted, one of the benefits is the building of financial reports from the accounting data, without any framework or constraints such as with a predefined chart of accounts. In one embodiment, a partial financial statement is built by grouping some accounts into financial statement items and by grouping financial statement items into totals. The user has great flexibility to enter any financial statement item description and group whatever accounts it desires for processing. A further variation provides a higher level application with a graphical user interface providing selectable options for financial statement item description as well as providing some user friendly interface for the grouping of accounts.

Figures 26A, 26B:
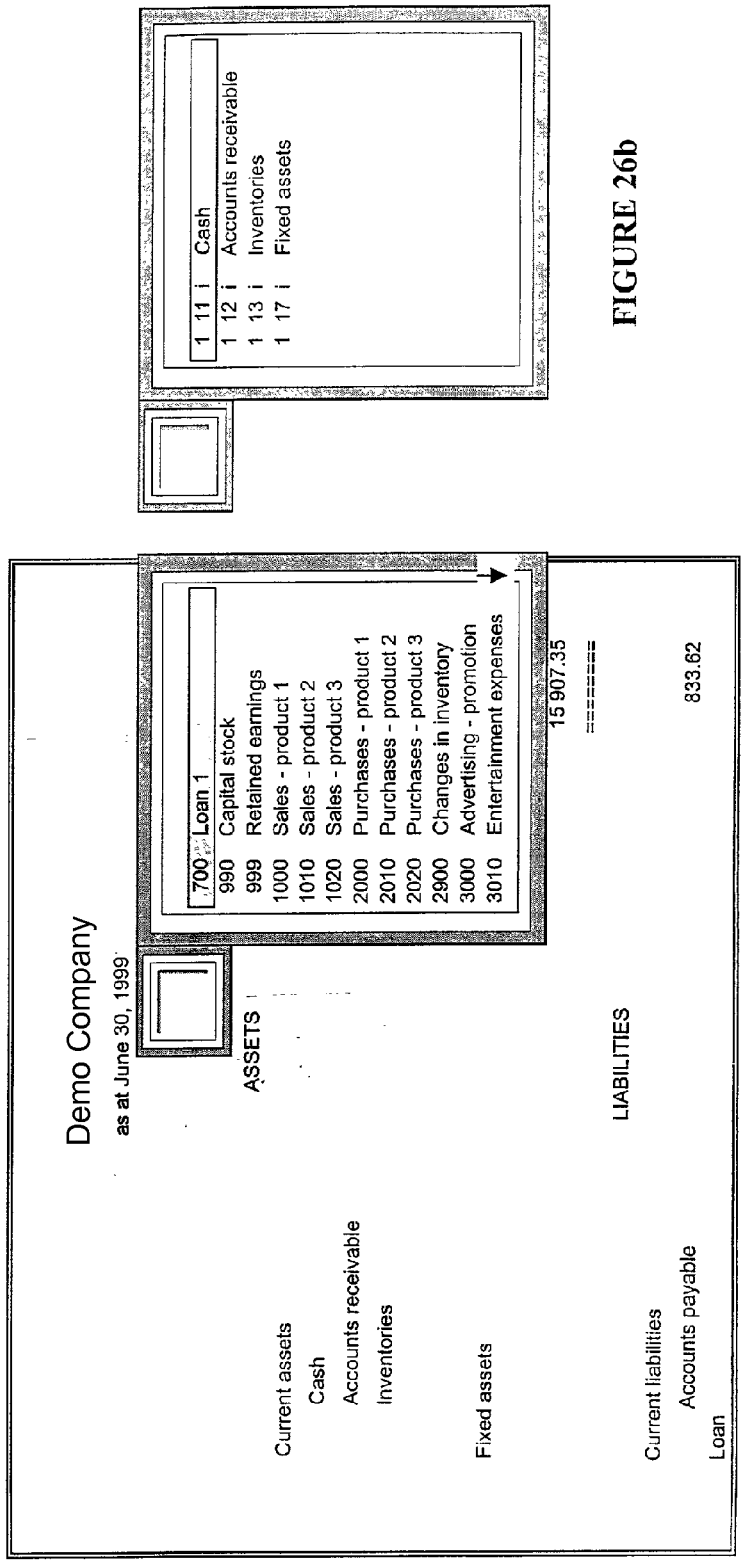
FIG. 26a and 26b are screen displays showing lists available from a word processor according to one embodiment.

The system can be integrated with a word processor or similar program and be used to build complete financial statements with the complementary notes and the additional information. The system would be included to existing word processors. The user would prepare the formatting of the financial statement and would call secondary data entry windows when wanting to include accounting data. The system would process the accounting data as previously described and would include the right amounts inside the reports, created by the user, with windows. The financial statement module processes the accounting data as previously described and includes the right amounts inside the reports, created by the user, with windows available as shown in FIG. 26a and FIG. 26b. This feature is highly useful to produce reports with customized formatting.

The method in one embodiment makes the distinction between two types of balances appearing on a financial statement, allowing the user to group accounts into financial statements items and to group financial statements items into totals, using simple point and click on the screen. Thus, the optimal data structures, algorithms and display module of this unique and universal system, enable building of any type of financial statements with a computer, as described herein.

As detailed herein, the present invention allows reading, organizing and manipulation of accounting data such as trial balances that may be read by using the print command to 'print to disk' instead of printing paper by any accounting software. And, it should be understood that the system allows the building of combined and consolidated financial statements, using simple point and click on the screen, via the unique and flexible and universal method to build financial statements.

According to one embodiment, the present invention processes the accounting data in memory that is not a hard drive or disk drive, but rather is RAM or flash memory coupled to the computer. Since new element can be inserted anywhere in the data structure, no matter what memory address is available, the process of individual memory allocation space combined with the doubly linked data structure offers great flexibility for organizing and manipulating the accounting data, and fast speed process considering the use of memory addresses (pointers) providing electronic access, with no mechanical process, to the accounting data.

According to one embodiment, when the accounting data is input by the reading process, the identified data is typically loaded as data structures in memory resources. The use of central memory of the computer such as RAM avoids accessing other memory units, such as disk drives. In the situation where the amount of data is greater than the capacity of the memory of the computer, there is a saving or archiving process for storing the data in a larger memory storage device. According to one embodiment, the user provides a carried over date for the balance in order to separate the transactions and to save them in distinct files on the memory resource. The data can be retrieved from the memory resource as needed for subsequent processing.

It should be evident that any accounting software can integrate the universal methodology for building financial statements. In some embodiment the accounting system can simply import bookkeeping data by going through the printing/reading of ASCII files, importing the data or otherwise obtaining an electronic file of the data. Word processors offers all the flexibility required to produce final and complete financial statements, but word processors offer no integration with the accounting data of accounting systems.

The present invention thus provides a universal method for building financial statements providing the capacity to read, organize and manipulate the accounting data of any accounting software, word processor software such as Microsoft Word, WordPerfect, or spreadsheet software such as Microsoft Excel, Lotus 123, or editing software such as Page-Maker, and QuarkXpress, and is able to integrate accounting data of any accounting systems. While some existing accounting software systems offer the ability to save data into readable files by other software systems, the system of the present invention provides the capability to read, organize and manipulate accounting data by any accounting software therefore allowing other software (such as spreadsheets) to read the accounting data. It is no longer the accounting software that allows the other software to read its accounting data—rather, the other software (such as spreadsheets) has the capability to read the accounting data of any accounting software.

The system can also be used as an external tool without any accounting software or as an internal tool by integrating the algorithms described herein inside any software (accounting, word processing, etc.) running on micro-computers, mini-computers and main-frame computers, or can be used independently in order to generate financial statements. Once the financial statement is built, the system allows levels of detail for a balance appearing on the financial statement: (a) details for a financial statement item; (b) details for an account balance; and (c) details of a document.

Depending on the source of the accounting data, the system can display the detail up to the original transaction and any modifications of the transaction will be reflected on the financial statement. As described herein, the present invention has the capacity to read accounting data by any accounting software, and offers a unique and universal method to build financial statements from this accounting data, along with levels of details from the consultation of the financial statement. A limited version of the system has been implemented in order to demonstrate some of the features. It should be readily apparent that further variations and applications are within the scope of the invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for generating a customized financial report, comprising:
   in an electronic device, a read module for reading accounting data and identifying a plurality of accounting data elements within the accounting data;
   a data organization module, communicatively coupled to the read module, for generating data structures for the identified accounting data elements;
   a storage device, communicatively coupled to the data organization module, for storing the identified accounting data elements;
   a report generator, communicatively coupled to the storage device, for transforming the stored accounting data elements to generate at least one financial report comprising at least one of a trial balance and financial statement; and
   an output device, communicatively coupled to the report generator, for outputting the at least one financial report;
   wherein the generated data structures comprise:
   a trial balance data structure comprising:
      a plurality of trial balance data structure elements representing accounts of the accounting data to be used in generating the at least one financial report, wherein the trial balance data structure elements are linked by a doubly-linked list of trial balance data structure element pointers; and
      at least one sub-list of trial balance data structure element pointers, for grouping the accounts of the accounting data into financial statement items to be used in generating the at least one financial report; and
   a financial statement data structure comprising:
      a plurality of financial statement data structure elements representing financial statement items to be used in generating the at least one financial report, wherein the financial statement data structure elements are linked by a doubly-linked list of financial statement data structure element pointers; and
      at least one sub-list of financial statement data structure element pointers, for grouping the financial statement items into totals to be used in generating the at least one financial report.

2. The system of claim 1 further comprising a dynamically allocated storage mechanism for storing the trial balance data structure elements, the financial statement data structure elements, the sub-lists, and the doubly-linked lists, and wherein each doubly-linked list comprises a next pointer and a previous pointer.

3. The system of claim 1 wherein each trial balance data structure element includes a LINKTRANS field storing a corresponding LINK vector element sequential number, and wherein each element of the LINK vector comprises a dynamically allocated memory address of a trial balance data structure element.

4. The system of claim 1 wherein the generated data structures further comprise a transaction data structure comprising:
   a plurality of transaction data structure elements representing transactions associated with the accounts, wherein the transactions are linked to respective accounts, and wherein the transaction data structure elements are organized as a doubly-linked list.

5. The system of claim 4 wherein each transaction data structure element comprises a LINKCHART field storing an associated LINK vector element sequential number, and wherein each element of the LINK vector comprises a dynamically allocated memory address of the trial balance data structure element.

6. The system of claim 4 wherein the generated data structures further comprise a displayline data structure comprising:
 a plurality of displayline data structure elements linked by a doubly-linked sub-list of displayline data structure element pointers, each pointer linking a transaction data structure element to a corresponding trial balance structure element by including a pointer of a first element of each sub-list of displayline data structure element pointers stored in the trial balance data structure.

7. The system of claim 1 wherein the at least one sub-list of trial balance data structure element pointers comprises at least one doubly-linked list, and wherein the sub-list of trial balance data structure element pointer group the accounts into financial statement items by including a pointer of a first element of each sub-list of trial balance data structure element pointers stored in the financial statement data structure.

8. The system of claim 1 wherein the at least one sub-list of financial statement data structure element pointers comprises at least one doubly linked list, and wherein the financial statement items are grouped into totals by including a pointer of a first element of each sub-list of financial statement data structure element pointers stored in the financial statement data structure.

* * * * *